April 24, 1945.  L. P. CROSMAN  2,374,333
MULTIPLYING CALCULATOR
Filed April 29, 1941  20 Sheets-Sheet 2

INVENTOR
Loring P. Crosman
BY
Stuart Wilder ATTORNEY

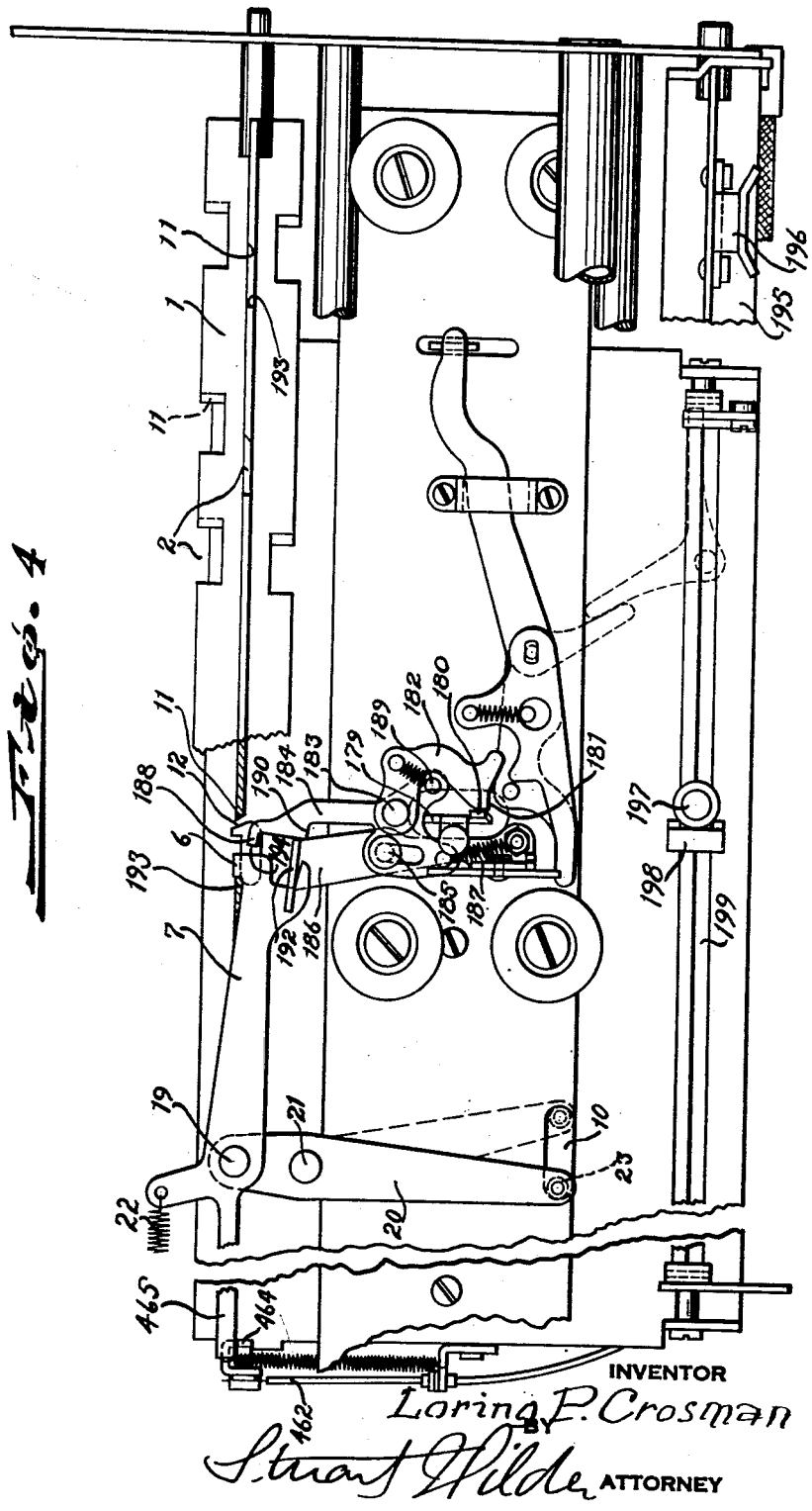

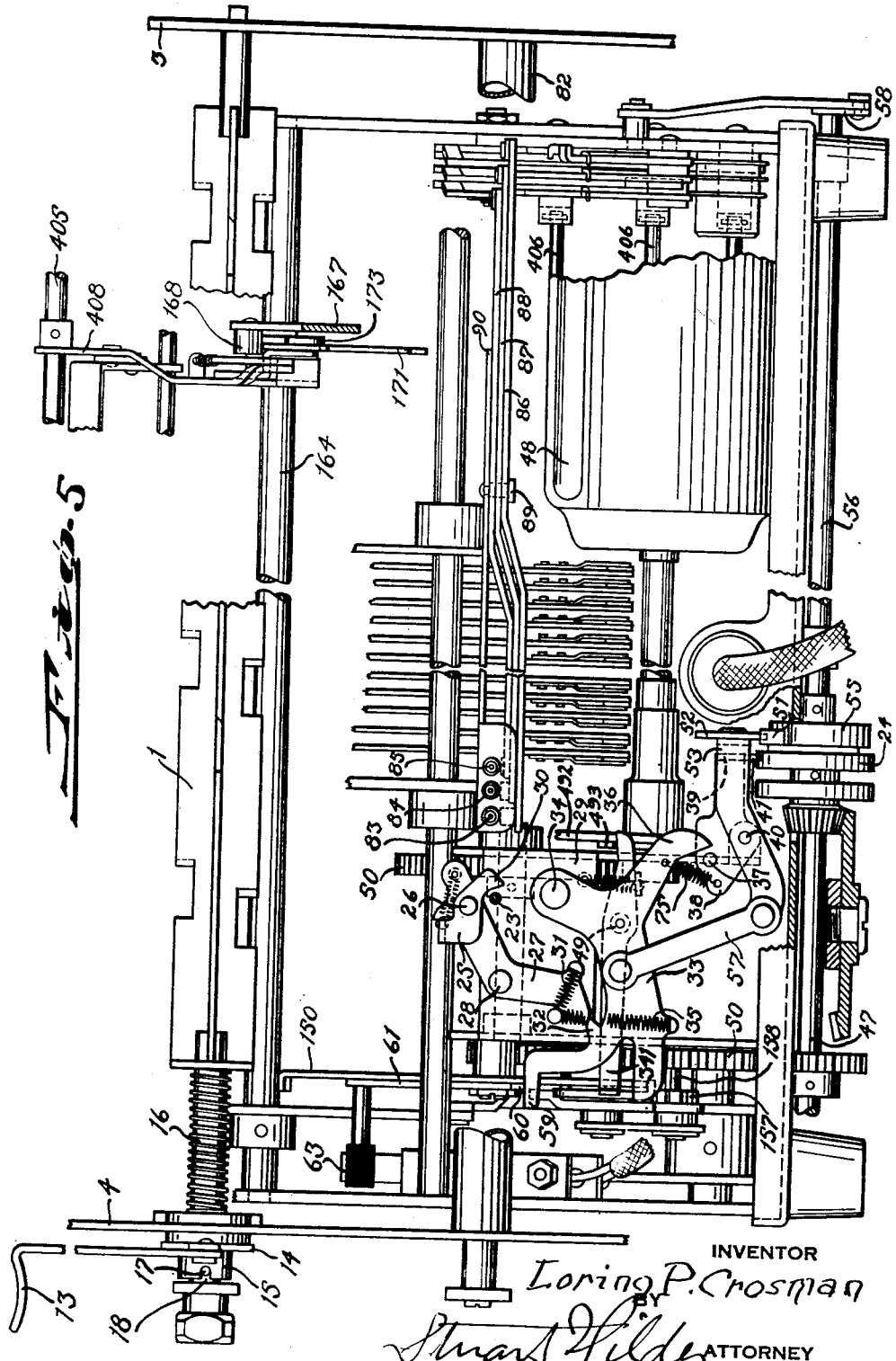

April 24, 1945.  L. P. CROSMAN  2,374,333
MULTIPLYING CALCULATOR
Filed April 29, 1941   20 Sheets-Sheet 5
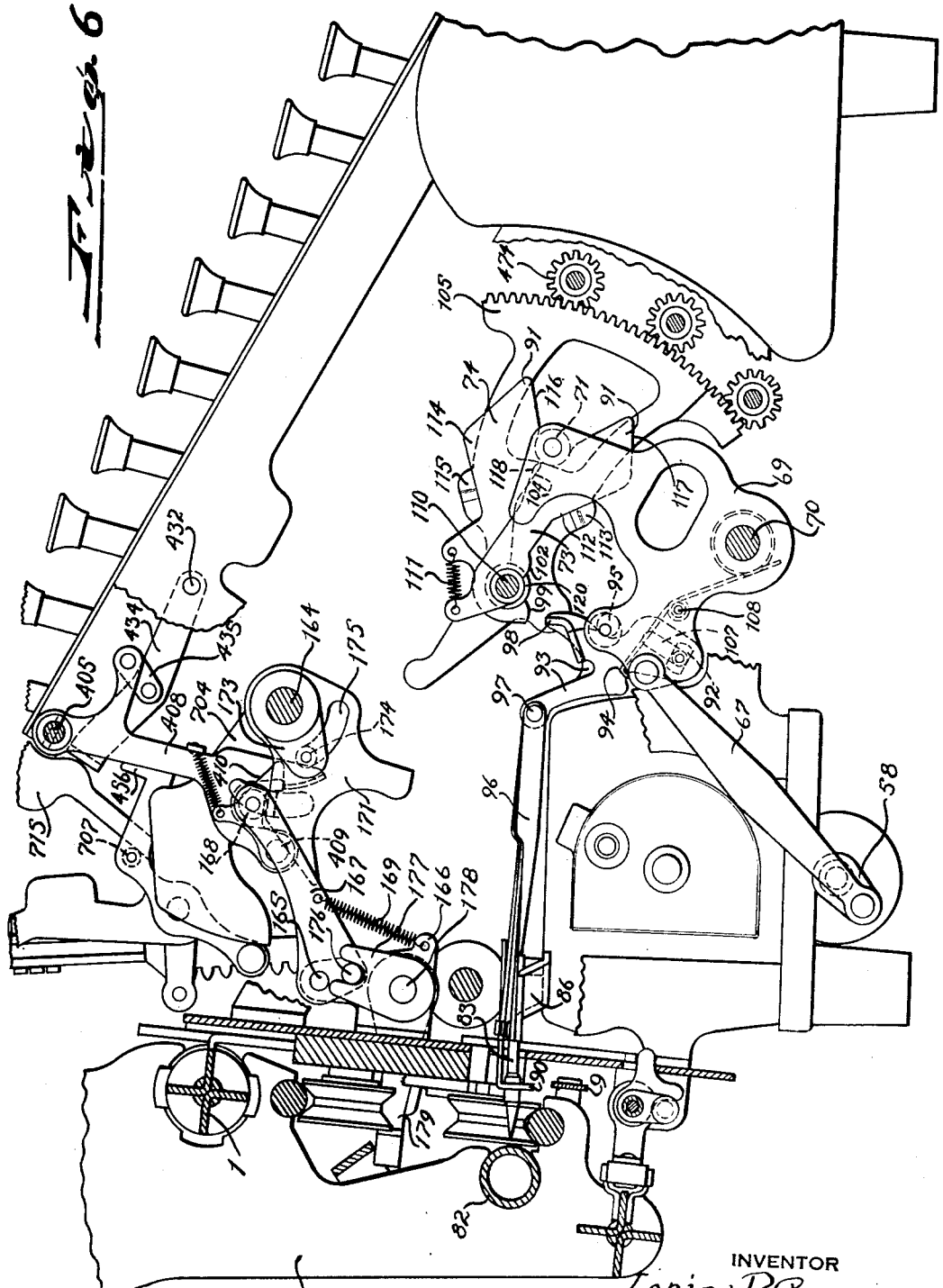
INVENTOR
Loring P. Crosman
BY Stuart Wilder
ATTORNEY

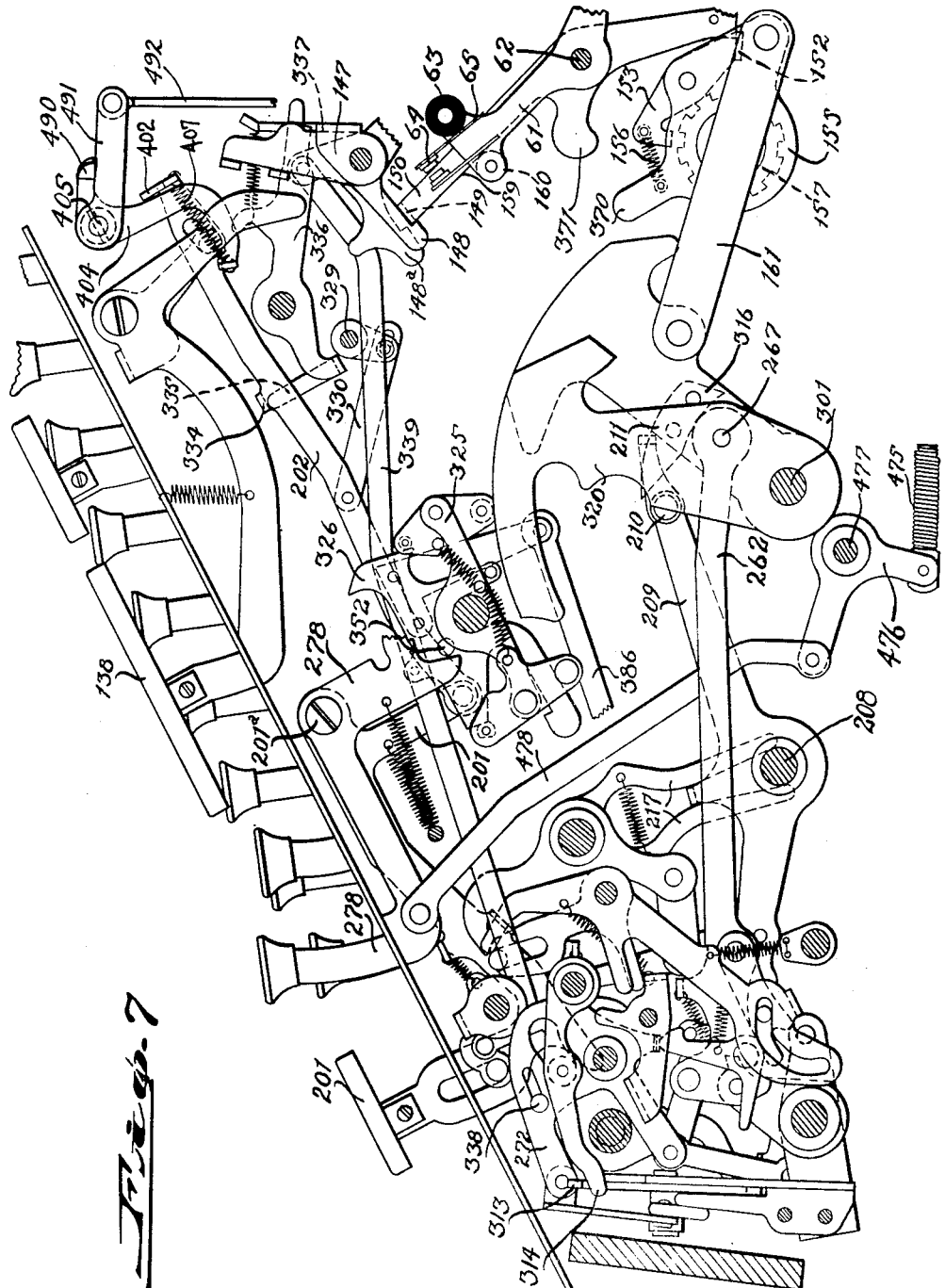

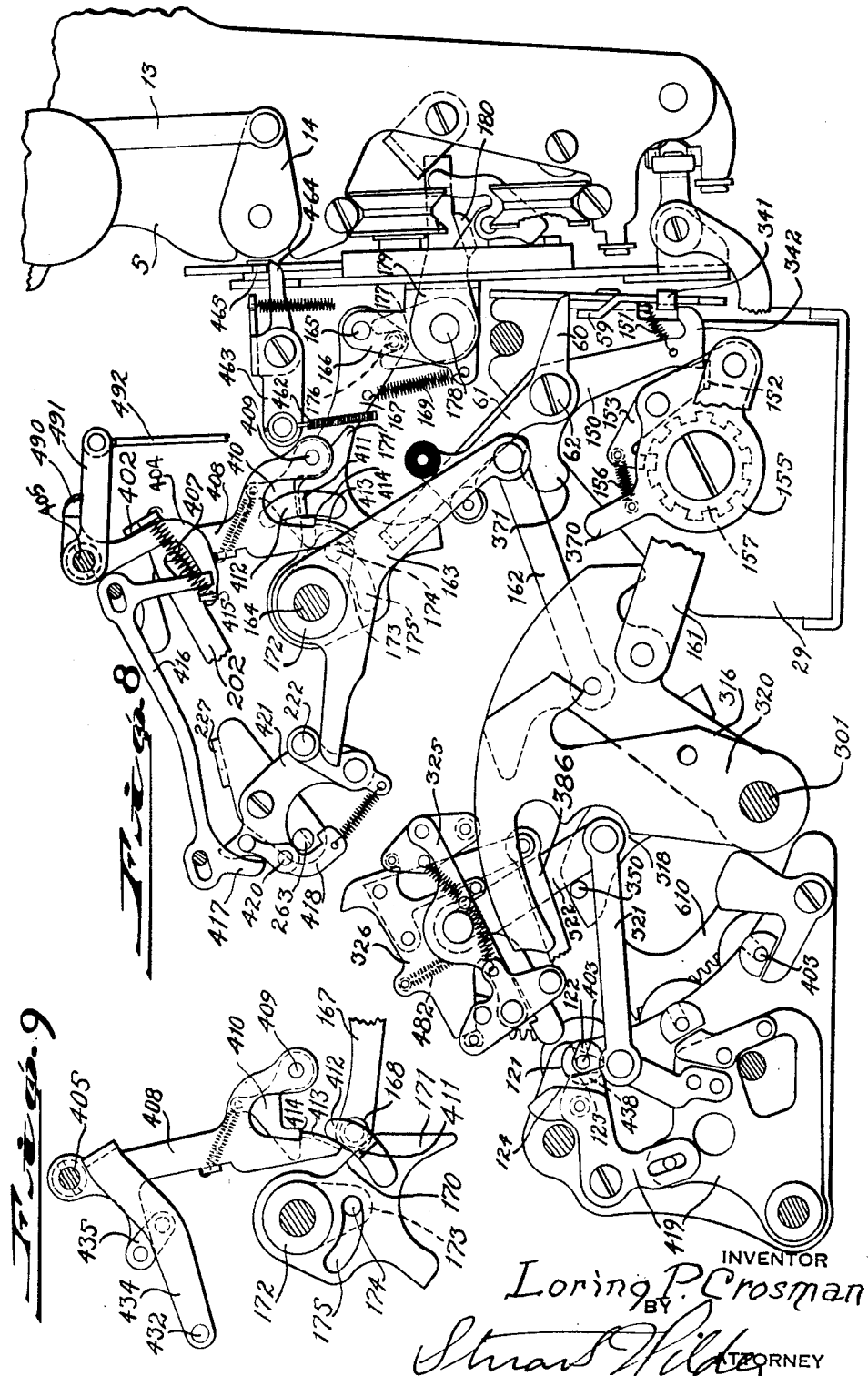

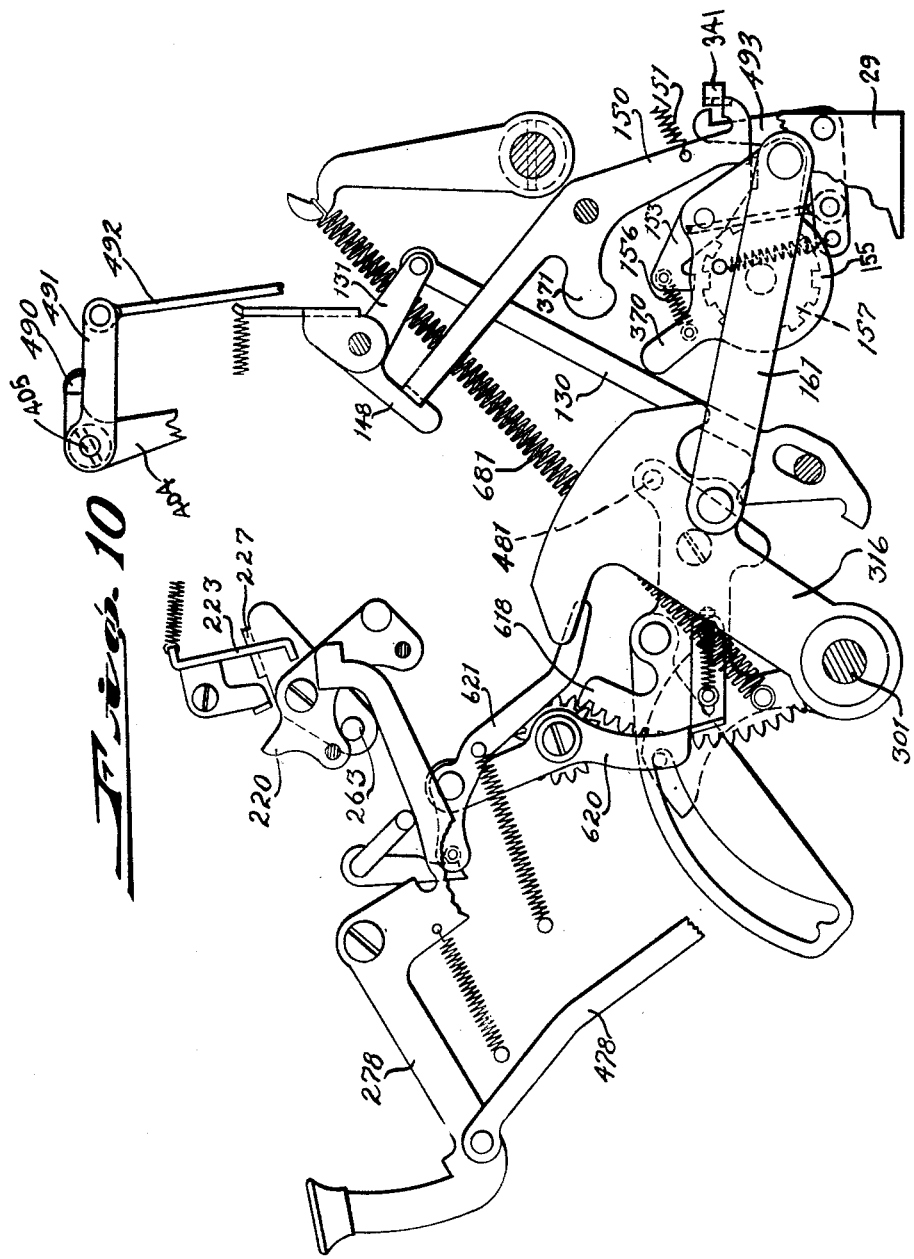

April 24, 1945.  L. P. CROSMAN  2,374,333
MULTIPLYING CALCULATOR
Filed April 29, 1941  20 Sheets-Sheet 9
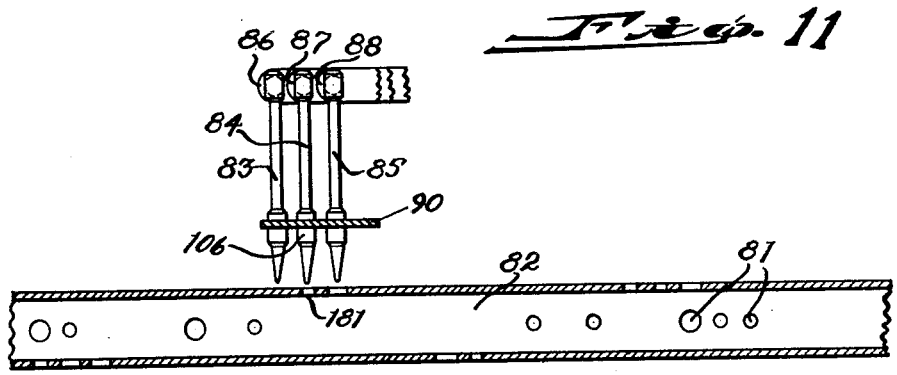
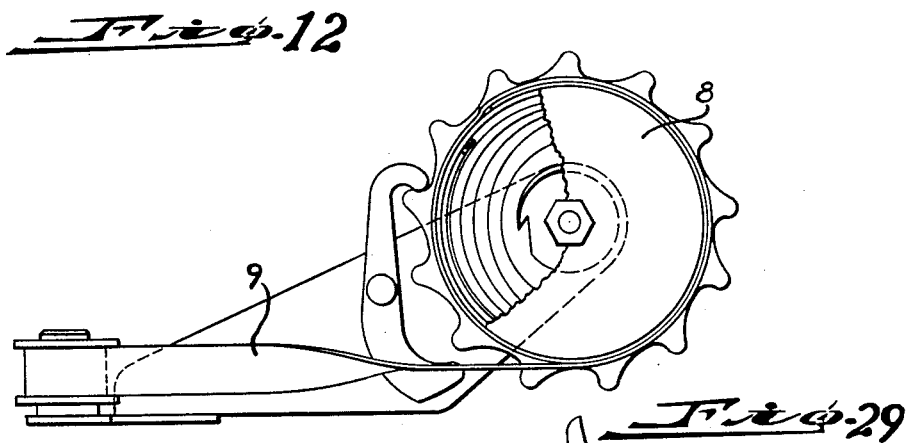
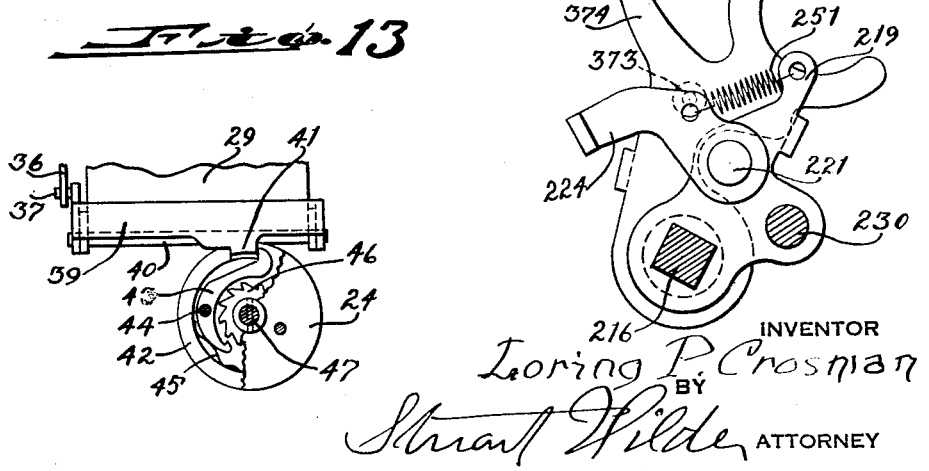
INVENTOR
Loring P. Crosman
BY
Stuart Wilde
ATTORNEY April 24, 1945.   L. P. CROSMAN   2,374,333
MULTIPLYING CALCULATOR
Filed April 29, 1941   20 Sheets-Sheet 10

INVENTOR
Loring P. Crosman
BY Stuart Hilde ATTORNEY

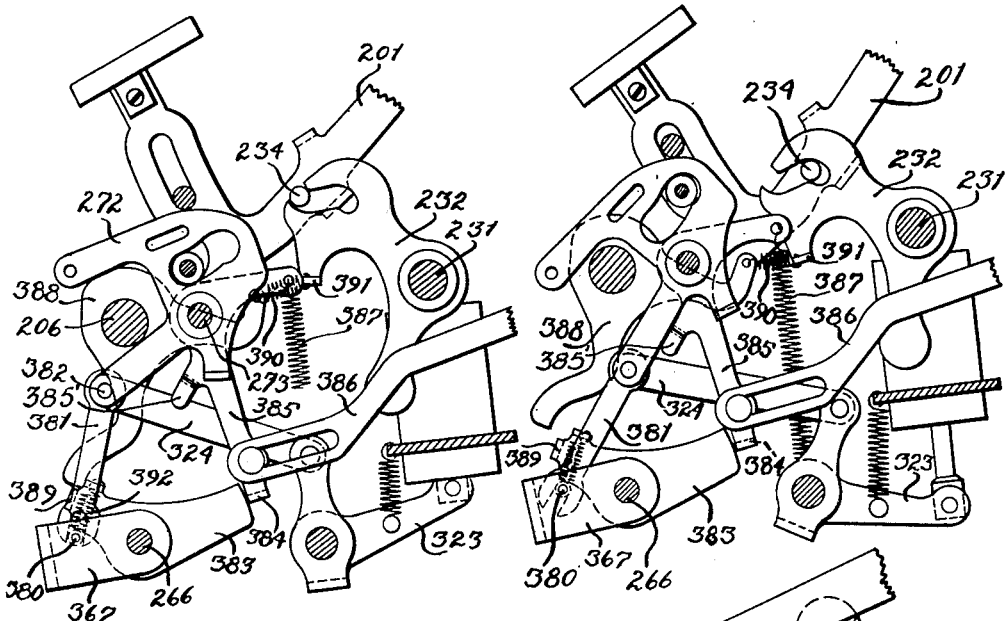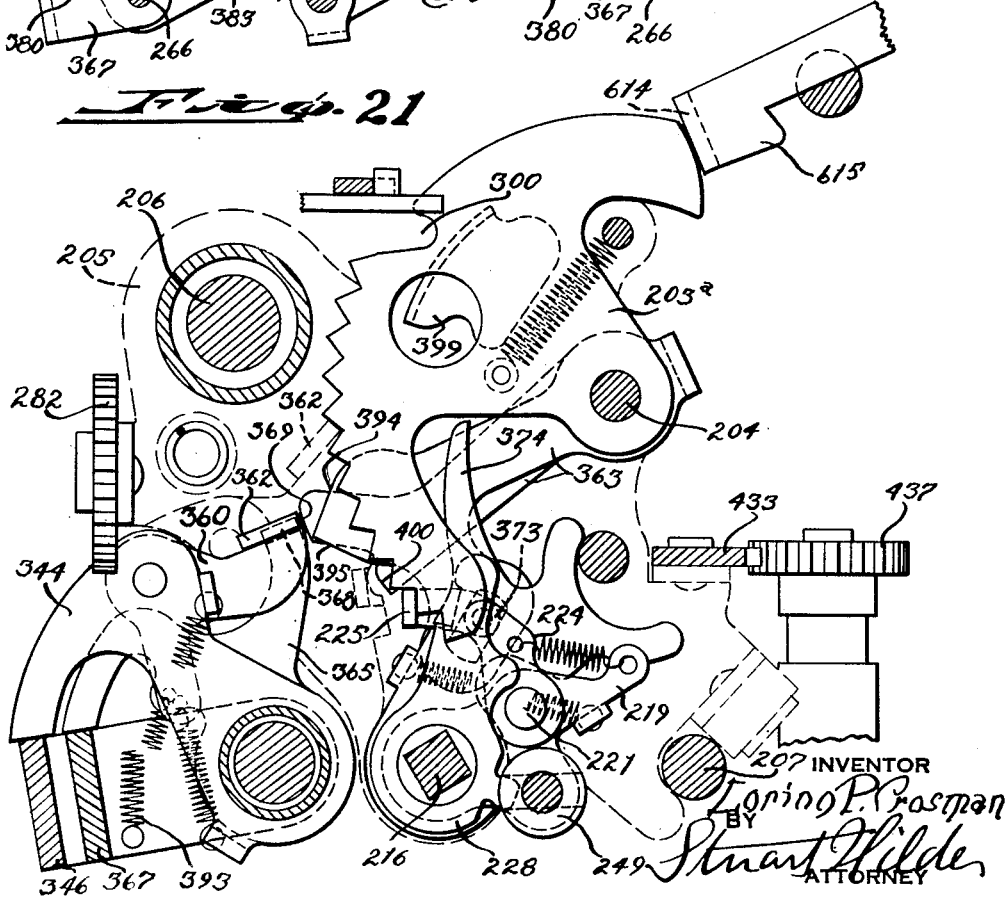

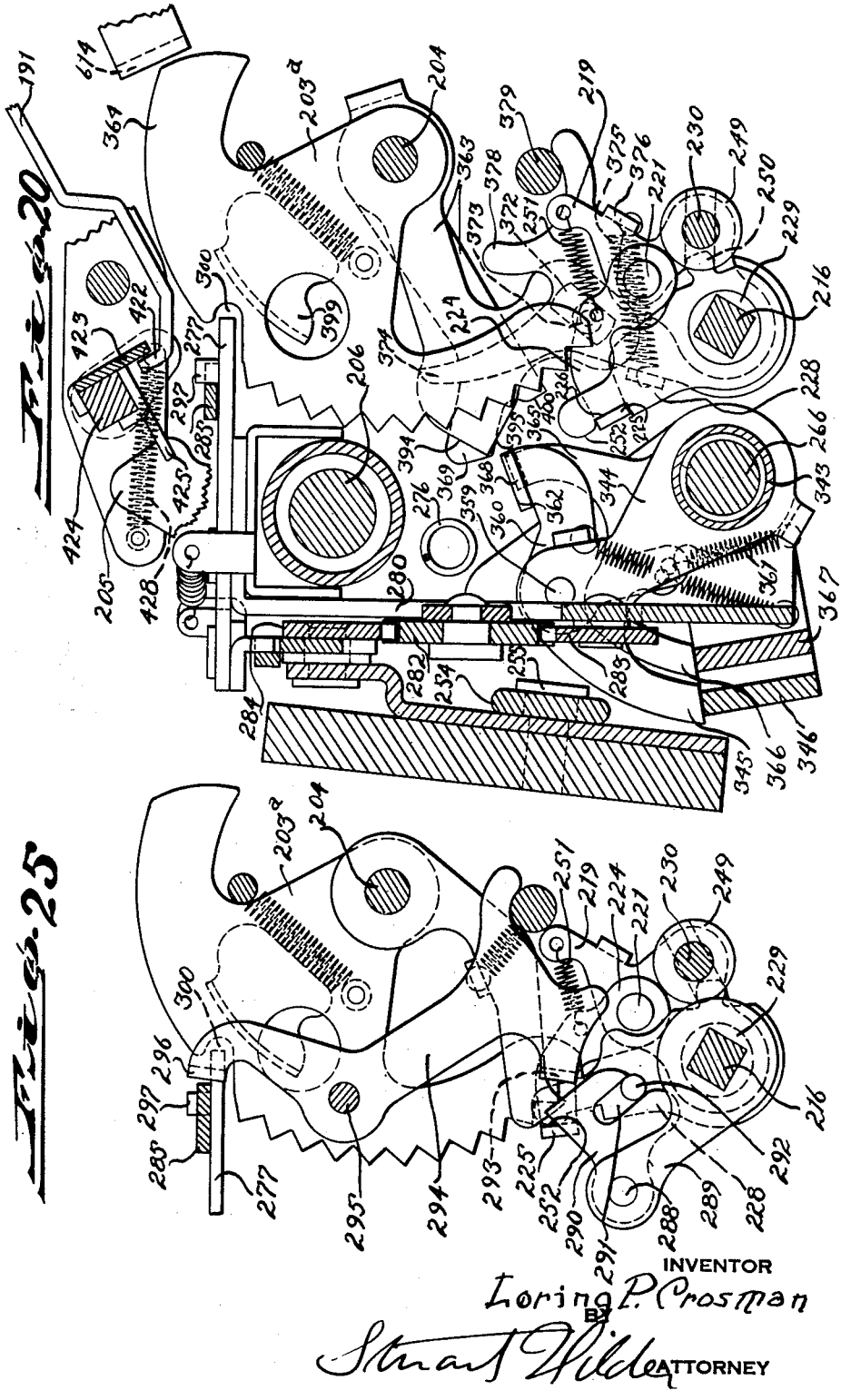

April 24, 1945. L. P. CROSMAN 2,374,333
MULTIPLYING CALCULATOR
Filed April 29, 1941 20 Sheets-Sheet 13
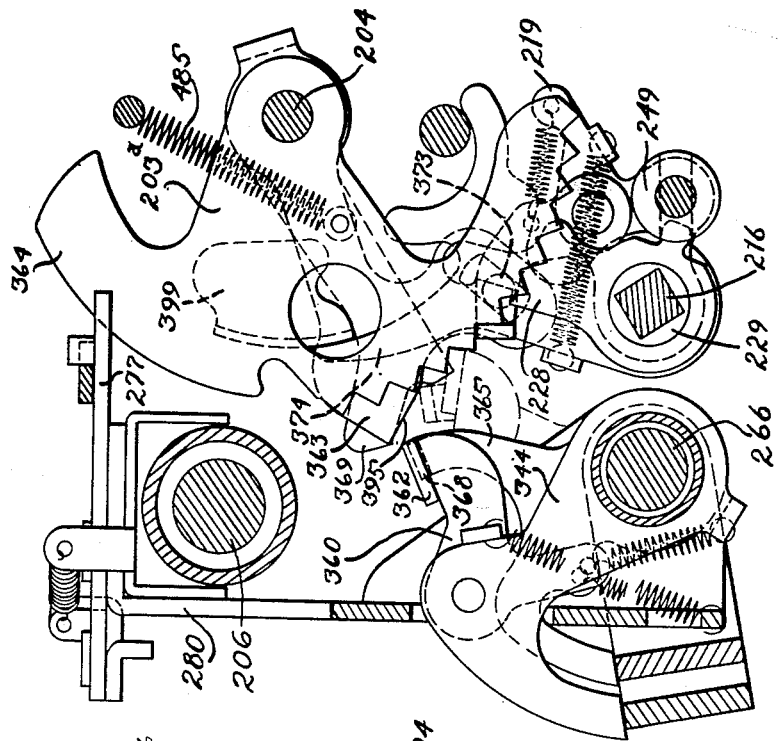
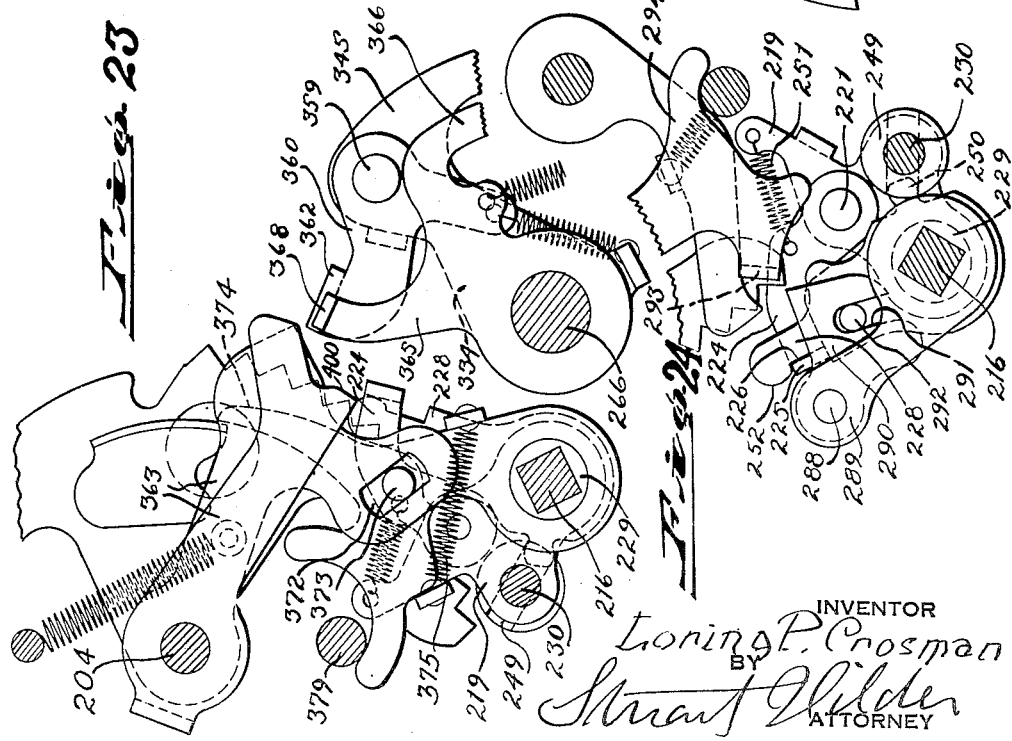

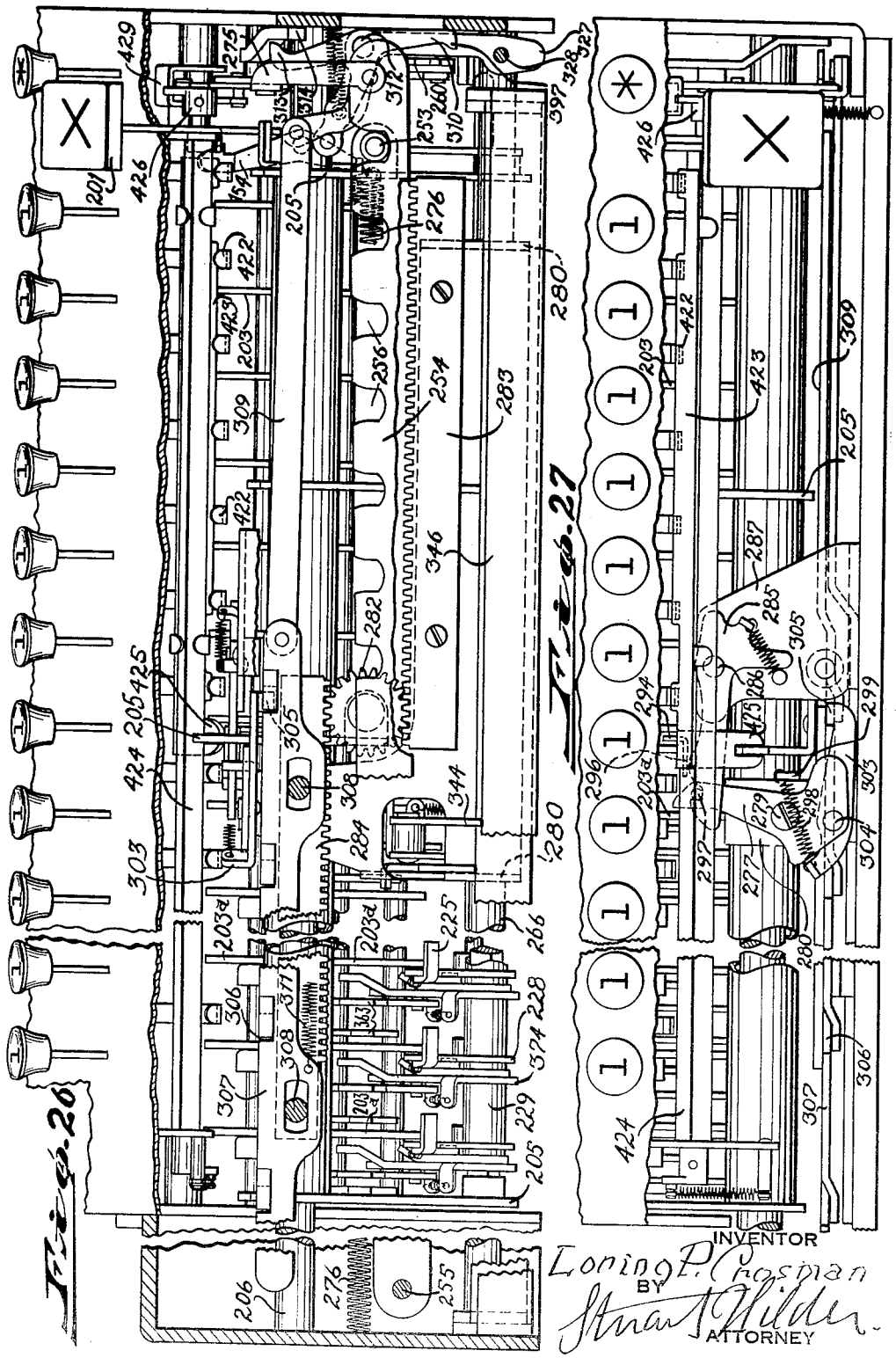

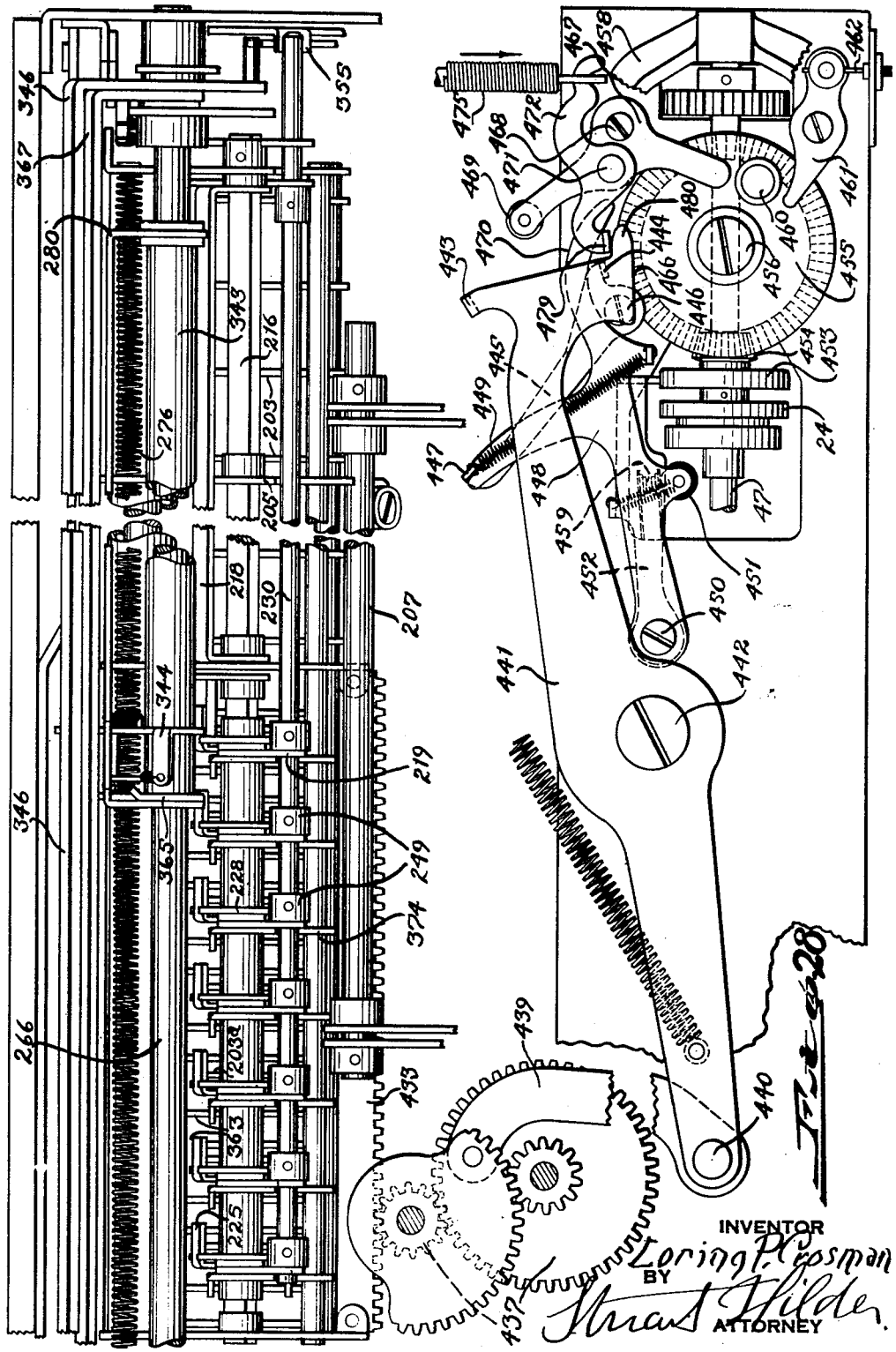

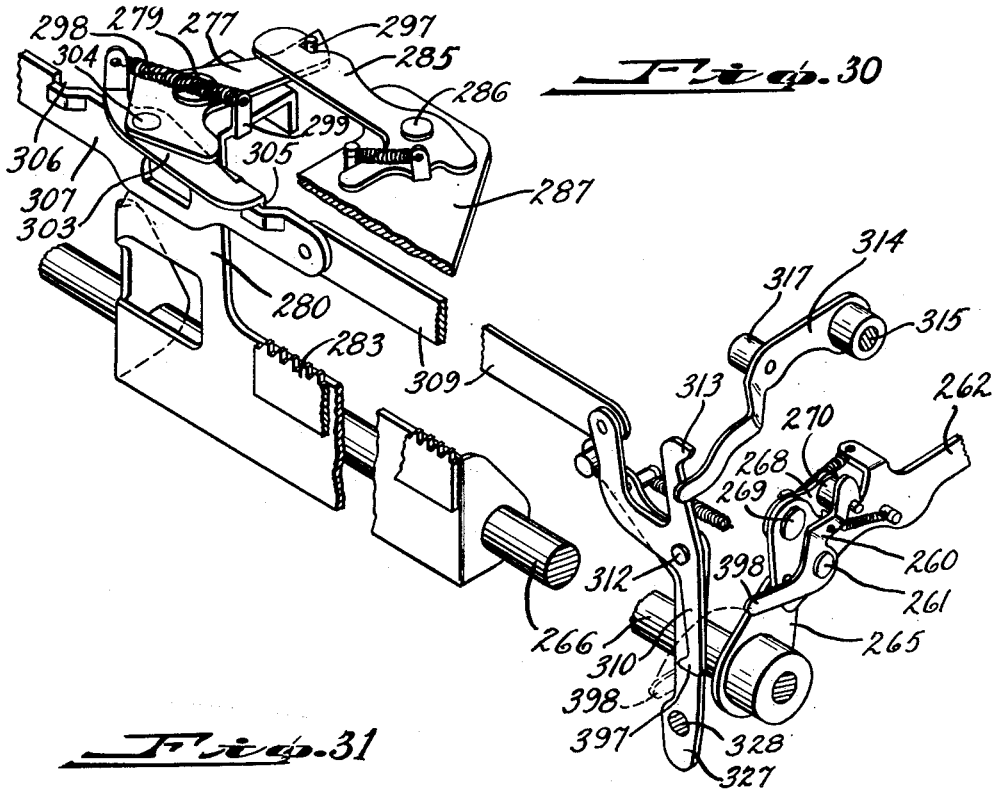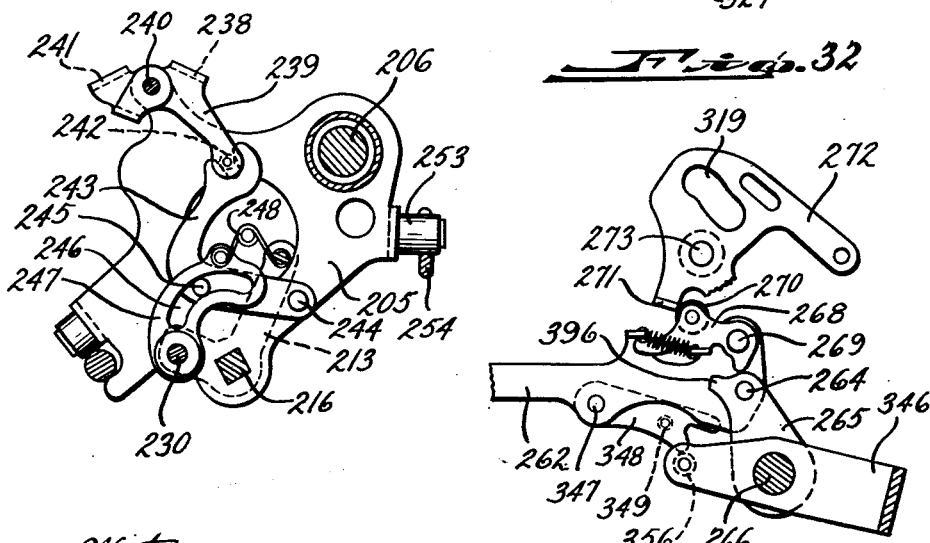

April 24, 1945.　　　L. P. CROSMAN　　　2,374,333
MULTIPLYING CALCULATOR
Filed April 29, 1941　　20 Sheets-Sheet 17
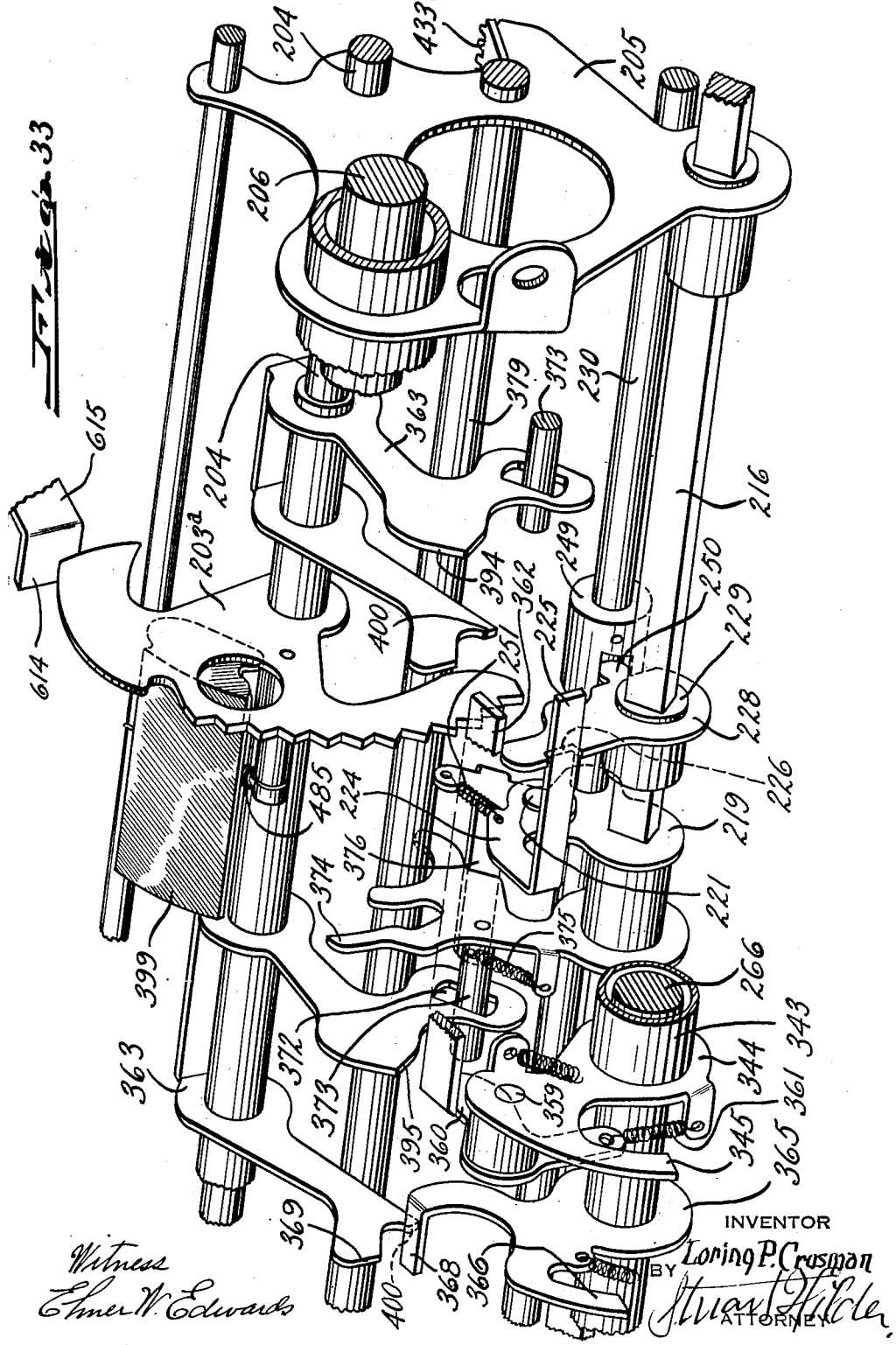
INVENTOR
Loring P. Crosman April 24, 1945.   L. P. CROSMAN   2,374,333
MULTIPLYING CALCULATOR
Filed April 29, 1941   20 Sheets-Sheet 18
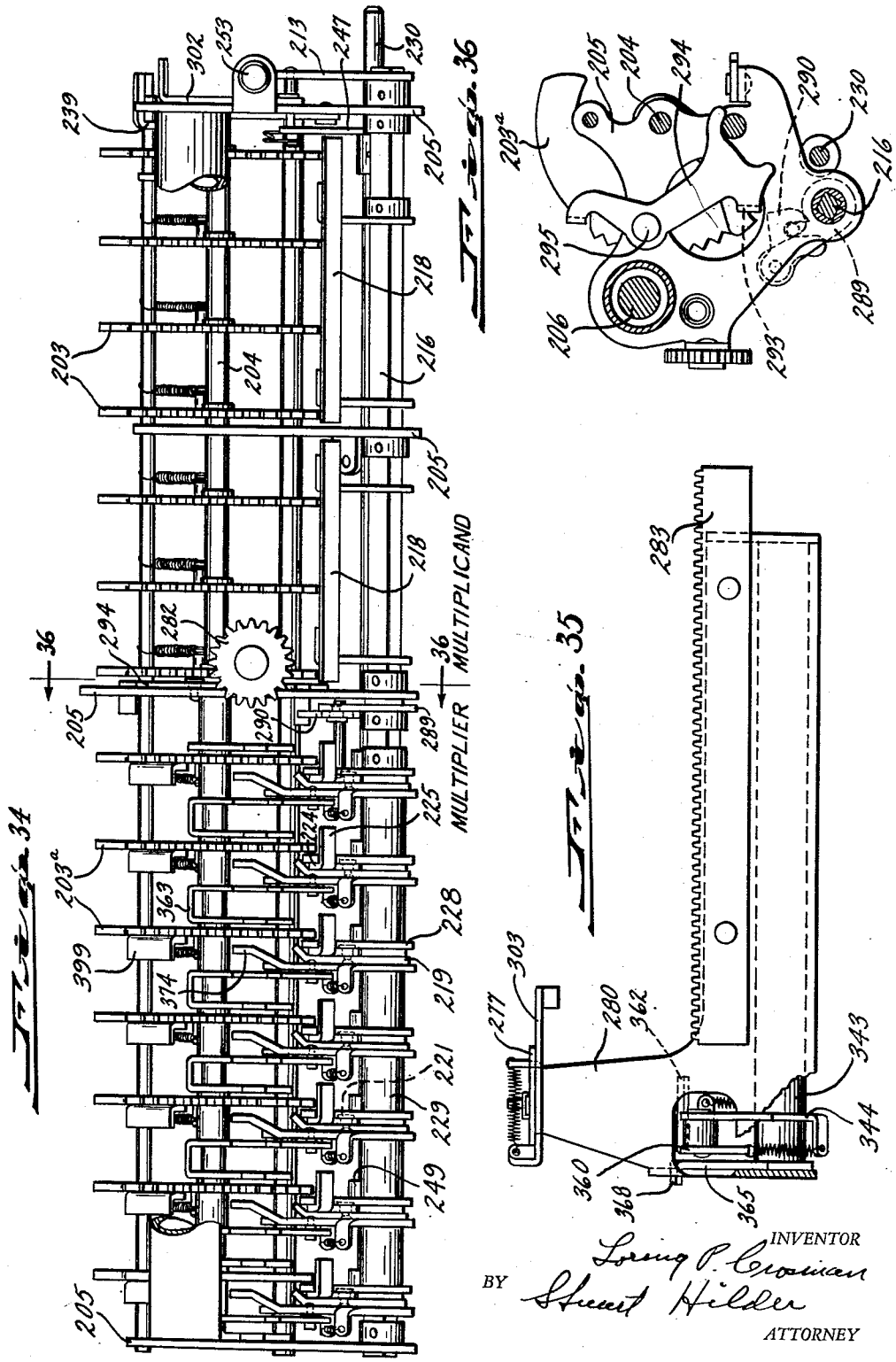
INVENTOR
Loring P. Crosman
BY Stuart Hilder
ATTORNEY

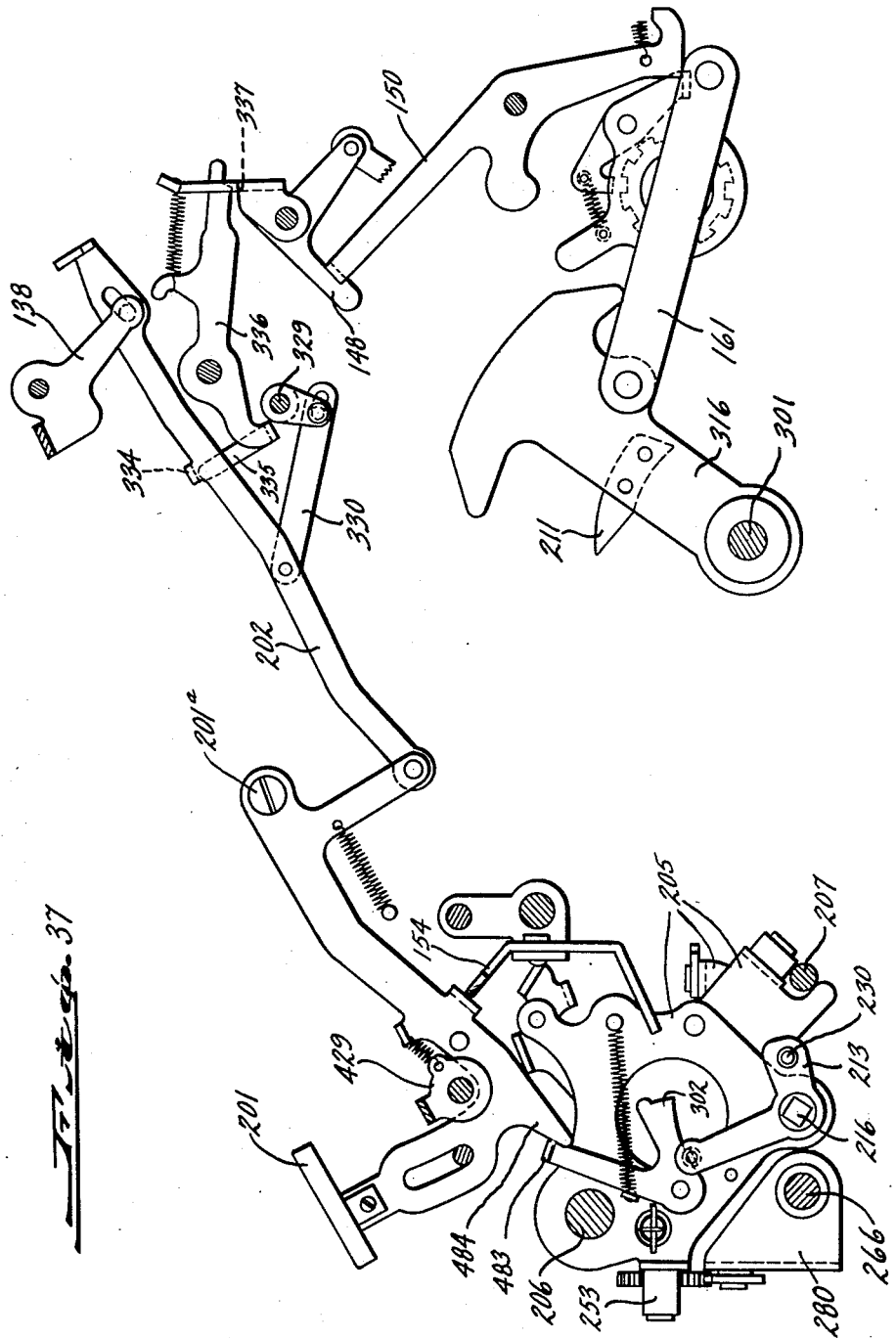

April 24, 1945.  L. P. CROSMAN  2,374,333
MULTIPLYING CALCULATOR
Filed April 29, 1941  20 Sheets-Sheet 20
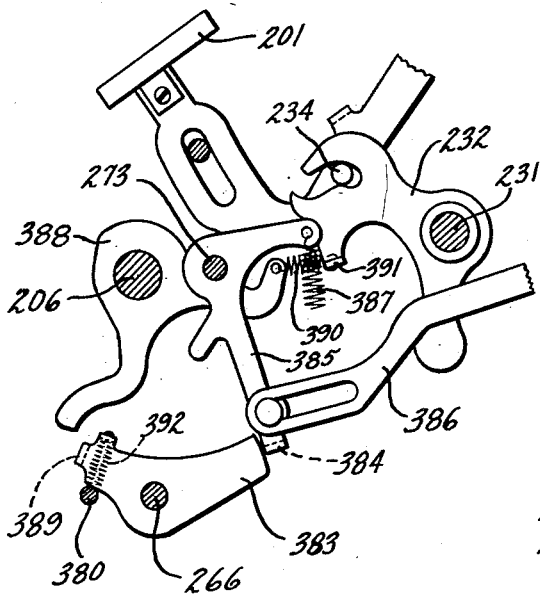
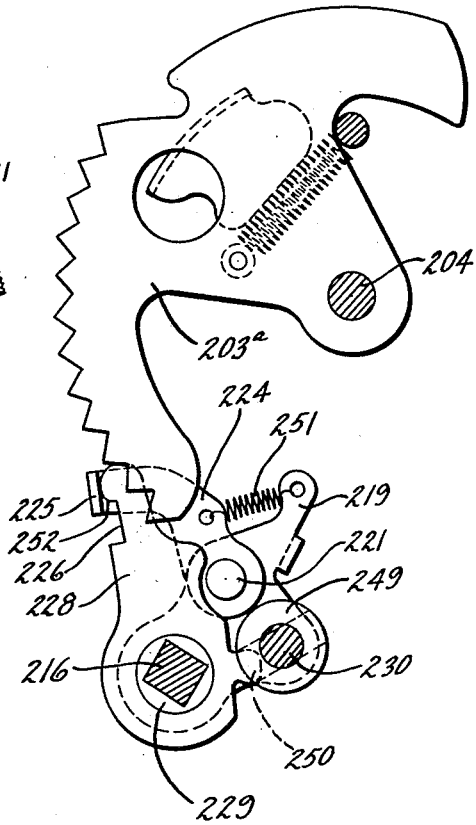
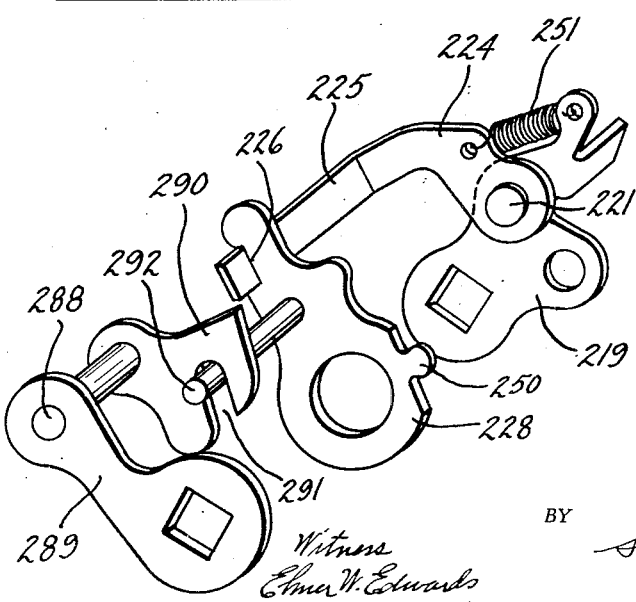
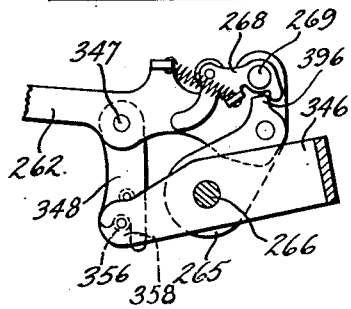

Patented Apr. 24, 1945

2,374,333

UNITED STATES PATENT OFFICE 2,374,333

MULTIPLYING CALCULATOR

Loring Pickering Crosman, Maplewood, N. J., assignor to Monroe Calculating Machine Company, Orange, N. J., a corporation of Delaware Application April 29, 1941, Serial No. 390,946

5 Claims. (Cl. 235—60)

The invention has relation to multiplying calculators being herein shown as applied to a listing calculator of the general type disclosed in the United States patent issued to Clyde Gardner, deceased, July 12, 1932, No. 1,867,002 and as modified by United States Patent No. 1,932,013 issued on October 24, 1933, to Loring P. Crosman and No. 1,946,572 issued to the same inventor on February 13, 1934. The register and tens carry mechanism is of the crawl carry type and of well known structure, such as disclosed in United States Patent No. 1,828,180 issued October 20, 1931, to Clyde Gardner, deceased. The present application is a continuation in part of abandoned application Serial No. 164,480, filed September 18, 1937.

According to the invention provision is made for storing a complete multiplier value and for employing the mechanical representation of said value, digit by digit, to control the successive product registrations determined by said multiplier value and by a multiplicand value set in the keyboard of the machine. An important feature of the invention lies in the provision of means, designed for use in a listing calculator provided with a single printing head for recording both factors and the product, said means being capable of registering the entire product automatically, following the setting up of the two factors, by means of appropriate digit keys, and the depression of a single motor key which determines the character of the operation.

The invention consists in the novel construction and combination of parts, as set forth in the appended claims.

In the accompanying drawings illustrating the invention,

Fig. 4 is a detail rear elevation of the platen carriage tabulating means.

Fig. 5 is a fragmentary rear elevation of the machine, with the platen carriage removed and showing certain parts controlling the accumulator selecting clutch.

Fig. 6 is a left hand elevation with the casing removed and the side frame broken away, showing the accumulator selecting mechanism.

Fig. 7 is a right hand elevation taken just inside the framing, showing the control keys and associated mechanisms.

Fig. 8 is a right hand elevation of the accumulator control mechanism.

Fig. 9 is a detail right hand elevation of the hammer block mechanism for non-printing.

Fig. 10 is a right hand elevation of the total key and associated mechanism.

Fig. 11 is a detail plan view of a portion of the program control mechanism.

Fig. 12 is a detail view of means for advancing the platen carriage.

Fig. 13 is a detail view of a one cycle clutch, used for accumulator selecting and for returning the factor carriage to normal.

Fig. 18 is a right hand elevation of certain parts set by the multiplying key to control subtract setting of the accumulator during short cut operations.

Fig. 19 is a similar view, parts being shown in operated position.

Fig. 20 is a vertical section, looking toward the left through the multiplier portion of the factor carriage, parts being shown in normal position.

Fig. 21 is a similar view showing the multiplier storage detent devices in operated position, with no short cut tens involved.

Fig. 22 is a similar view showing position of the parts upon completion of a short cut tens setting.

Fig. 23 is a left hand elevation of the same before completion of a short cut tens setting.

Fig. 24 is a detail view of the parts associated with the units multiplier column, the parts being in normal position.

Fig. 25 is a similar view showing the parts set into active position.

Fig. 26 is a front elevation of the factor carriage, the casing being broken away.

Fig. 27 is a plan view of the same, the casing being broken away.

Fig. 28 is a bottom plan view of the same and showing the factor carriage return mechanism.

Fig. 29 is a detail side elevation of a reversing switch control member and associated parts.

Fig. 30 is a fragmentary perspective view of the supplemental factor carriage and control devices.

Fig. 31 is a detail left hand elevation of parts shown in Fig. 16.

Fig. 32 is a similar view of parts shown in Figs. 15 and 17.

Fig. 33 is a fragmentary exploded perspective view of the multiplier portion of the factor carriage.

Fig. 34 is a front elevation of the factor carriage.

Fig. 35 is a front elevation of the supplemental, or multiplier counting finger carriage.

Fig. 36 is a vertical section taken on line 36—36 of Fig. 34.

Fig. 37 is a right hand elevation of the factor and supplemental carriages, including certain parts controlled by the multiplier key.

Fig. 38 is a detail view of the locating devices for the multiplier storage segments.

Fig. 39 is an exploded perspective view of certain parts shown in Figs. 24–25.

Fig. 40 is a detail view of certain parts shown in Fig. 19.

Fig. 41 is a detail view of parts shown in Fig. 32, in the position taken during a product registration.

General

Figure 1:
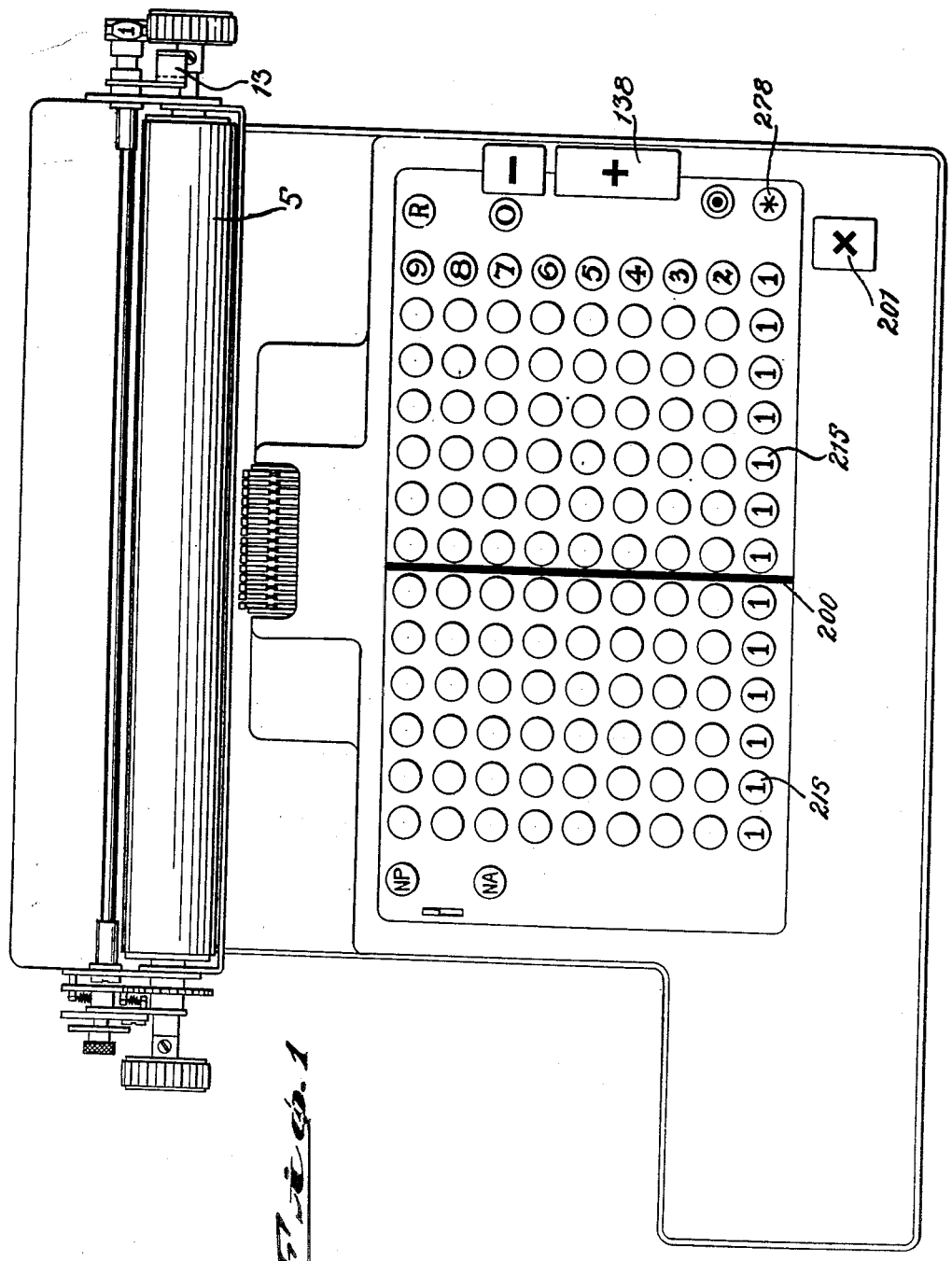
Fig. 1 is a diagrammatic plan view of a machine embodying the invention.
Figures 2, 3:
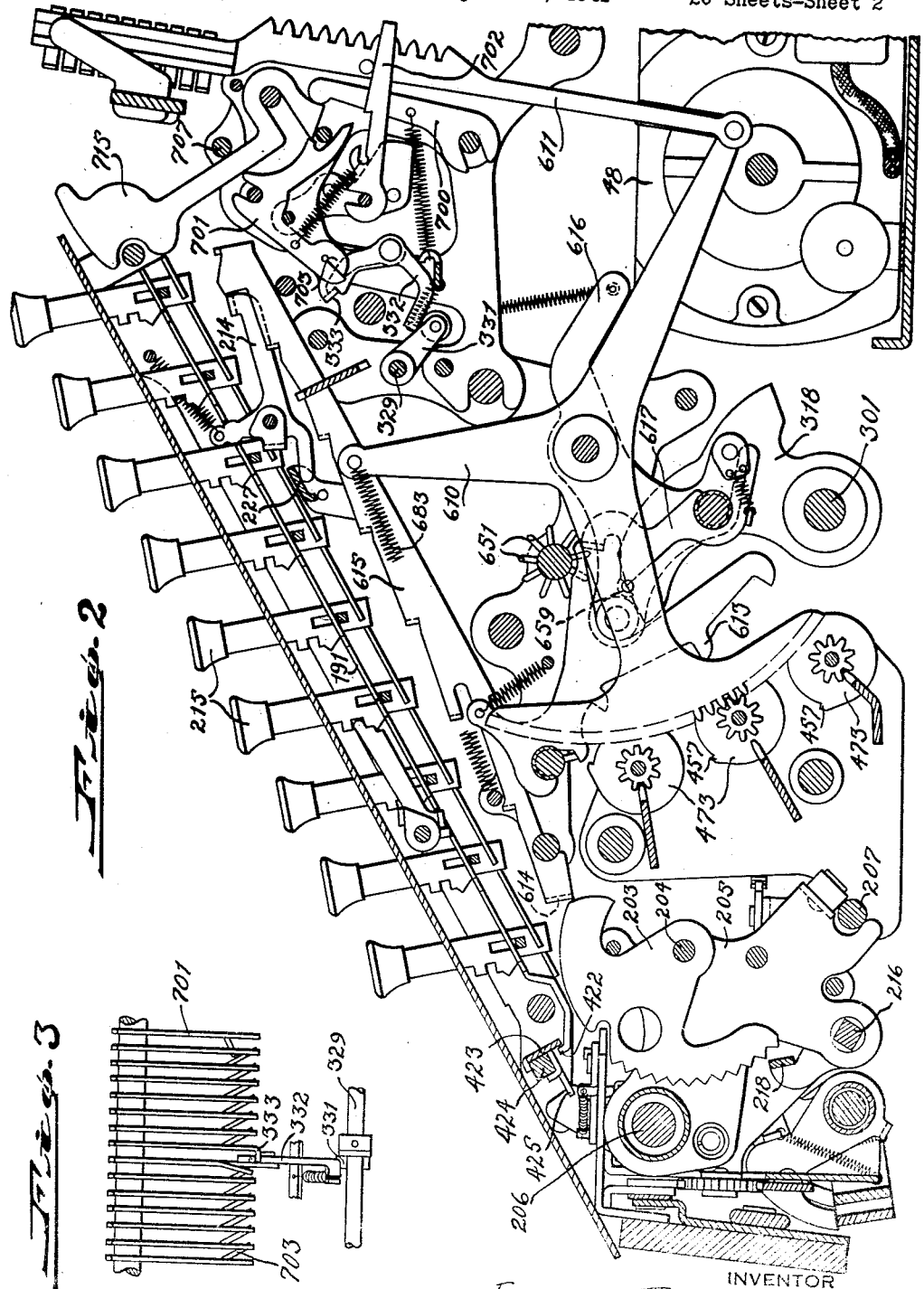
Fig. 2 is a vertical section taken through the keyboard, accumulator, printing and multiplying mechanisms.
Fig. 3 is a detail plan view of the split printing means.

In the machine illustrated amounts set up on the digit keyboard 215 (Figs. 1 and 2) are accumulated in one or more accumulators 473, either additively by engagement of an accumulator during the upward stroke or subtractively by engagement thereof during the downward stroke of reciprocatory actuating segments 610. The segments are reciprocated by movement of a rock shaft 301, preferably driven by an electric motor 48, said rock shaft having a cam 318, adapted to move a rocking frame 616, and thereby cooperating with the springs 683 of the segments to effect movement thereof. The movement of each segment is limited by engagement of a stop bar 615, carried by the segment, with the lower end of a depressed key 215, whereby the extent of movement will correspond to the value of such depressed key.

Depression of a key 215 will also operate a slide plate 191 related to the key column to release a column latch 214, adapted to hold bar 615 in rearward or zero position.

Type bars 611 are connected with the segments 610, and are raised thereby to bring the appropriate type to the printing line. Before the return of the adjusted segments by the frame 616, spring type hammers 715 will be released from latches 701, to print the item on a record sheet supported in a transversely shiftable platen carriage 5.

The type hammers 715 are adapted to be operated by spring actuators 700, but are normally held in tensioned position by latches 701. When a type bar is lifted, a tripping finger 702 is allowed to move into engagement with the corresponding latch 701, and at the end of the forward rotation of shaft 301, a frame upon which the tripping fingers are mounted is moved forwardly, releasing the hammers from those latches which have been engaged by the fingers 702. In order to print the zero characters in the lower order places wherein no amount from 1 to 9 has been set up, the higher order latches 701 are provided with offsets 703, (Figs. 2 and 3), lying in the planes of and designed to trip the lower order latches.

The hammers are restored and relatched during the return rotation of shaft 301 by means of a bail 707 operated through a reciprocatory cam 704 (Fig. 6).

Means for setting and securing the platen carriage in a columnar position (Figs. 4–6)

A tabulating bar 1, comprising two right angle members welded together at their apex, is rotatably supported in the frames 3 and 4 of the carriage 5. In each of the four plates of bar 1 are a series of notches 2, spaced in accordance with the columnar rulings of a given form sheet, and adapted by engagement with a projection 6 of a lever 7 to secure the carriage against lateral movement under the influence of a spring drum 8 (Fig. 12).

Spring drum 8 is mounted upon the left hand frame of the machine and has suitably secured thereto one end of a tape 9, the other end of which is secured to the right hand frame 4 of the carriage, as shown in Fig. 6. Upon disengagement of a notch 2 from the projection 6 of lever 7, as hereinafter described, drum 8 will act to move the carriage toward the left (right in Figs. 4 and 5).

Lever 7 (Fig. 4) is fulcrumed at 19 upon the lever 20, fulcrumed at 21 upon the rear frame of the machine and provided with a stud 23 adapted to contact with the walls of an aperture 10 of the frame, thus limiting the movement of lever 20.

In the contemplated mode of operation the carriage is set by hand to the right hand position, cam surfaces 11 of notches 2 contacting surface 12 of lever 7 to rock said lever downwardly, disengaging its projection 6 from the related plate of bar 1.

A thumb bar 13 (Figs. 5 and 8) is also provided, to disengage the bar 1 from projection 6 when shifting the carriage by hand. The lower end of thumb bar 13 is pivotally connected to an arm 14 provided with a hub 15 loosely mounted upon the journal 16 of bar 1. A pin 17 in journal 16 normally engages an aperture 18 of the hub 15.

Downward pressure upon thumb bar 13 will therefore rock lever 14 and through hub 15 and pin 17 rock the shaft 16 to lift the forward plate of bar 1 free of the projection 6 of lever 7. This will cause said lever, under the influence of spring 22, to be moved toward the left, thus rocking lever 20 to the position indicated by dotted lines (Fig. 4).

The carriage having been set to the desired columnar position, projection 6 of lever 7 will have reengaged the corresponding notch 2 of tabulating bar 1 and, under the influence exerted by spring drum 8, said bar will restore levers 7 and 20 to their normal positions.

During the excursion of lever 20, the pin 23 is adapted to operate means for engaging the accumulator selecting clutch 24 (Figs. 5 and 13) as follows:

Means for engaging the accumulator selecting clutch (Figs. 4–8 and 13)

As lever 20 is moved to the position indicated by dotted lines in Fig. 4, stud 23 is carried to the right (as viewed in Fig. 5) of a trip pawl 25 pivotally mounted at 26 upon the upper arm of a latch 27 pivoted at 28 upon a bracket 29.

Upon its return movement, however, stud 23 will contact the surface 30 of trip pawl 25 and rock the latch 27 against the tension of its spring 31, to free said latch from engagement with a projection 32 of a spring tensioned plate 33, pivotally mounted at 34 upon bracket 29. Upon release from latch 27 plate 33, under influence of spring 35, will be rocked clockwise about point 34, and arm 36 of said plate will contact a pin 37, fast to one arm 38 of a cross-over bar 39 (Figs. 5 and 13) pivotally mounted on a short shaft 40.

Cross-over bar 39 is provided with a projection 41 normally in engagement, through a suitable aperture cut in the casing 42 of clutch 24, with a pawl 43 pivotally secured at 44 to the casing of the clutch.

Contact of arm 36 with pin 37 will raise the cross-over bar 39, and projection 41 will be lifted free of the casing 42 and will disengage pawl 43, whereupon said pawl, under influence of a spring 45, will be rocked into engagement with a ratchet 46. Ratchet 46 is keyed to a drive shaft 47 having connection, through a gear train 50, with the motor 48, as shown in Fig. 5.

Secured to the casing 42 of clutch 24 is a cam 55, keyed to a shaft 56 which has a crank arm 58 fast on the opposite end thereof, as shown in Figs. 5 and 6.

During the previously described movement of plate 33 an arm 59 of said plate will engage projection 60 of a lever 61 (Figs. 5 and 8), rocking said lever about its fulcrum 62, to cause an insulated roller 63 fast thereto to close the contact points 64 (Fig. 7) of a switch 65 interposed in the circuit of electric motor 48.

Upon contacting of points 64 motor 48, through clutch 24 and the above described gear train, will drive crank arm 58 in a counter-clockwise direction as viewed in Fig. 6. The following means are provided to limit the movement of said crank arm to one complete revolution:

Near the end of the revolution of crank arm 58 a projection 51 of cam 55 will contact roller 52, fast to a member 53 loosely mounted upon shaft 40, rocking said member counter-clockwise, as viewed in Fig. 5.

Member 53 has link connection 57 with the plate 33 and as said member 53 is rocked the link 57 will restore plate 33 to its normal latched position and end 36 will release pin 37, to allow projection 41 of arm 39, under influence of spring 75, to rest upon the periphery of the casing 42 of clutch 24.

At the extreme end of a revolution of shaft 56 projection 41 will disengage pawl 43 from ratchet 46 and reengage with casing 42 of clutch 24, to secure shaft 56 and crank arm 58 in full cycle position.

*Means for selecting accumulators and the character of registration (Figs. 5, 6 and 11)*

As the carriage is set to the desired columnar position, one group of a series of orifices 81, of a tubular bar 82, suitably supported in the framing of the carriage, will be positioned opposite corresponding plungers 83, 84 and 85. Said plungers are loosely mounted on whiffletree levers 86, 87, 88, pivotally secured at the common fulcrum point 89 to the bracket 90, supported within the framing of the machine and acting as a guide support for the free ends of plungers 83, 84 and 85.

The bar 82 is adapted to limit rearward movement of the plungers 83, 84 and 85, to set cams 73 and 74 to cooperate with a roller 71 of a rock arm 69 having link connection 67 with crank arm 58.

Mounted by slot engagement 107 upon stud 92 of rock arm 69 are cam positioning levers 93, normally positioned against stud 92 and eccentric stud 95 of rock arm 69 by means of springs 94, also mounted upon rock arm 69 at 108; there being a lever 93 and cooperating cams 73, 74 related to each accumulator provided in the machine.

Positioning levers 93 have link connection 96 to one end of the whiffletree levers 86, 87 and 88 upon which are mounted the plungers 83, 84 and 85.

As the rock arm 69 is moved by crank arm 58 to its extreme forward position the cam positioning levers 93, under influence of springs 94, (there being a spring 94 related to each of the levers 93) will rock with said levers and through links 96 will rock levers 86—88 counter-clockwise about fulcrum point 89 (Fig. 5), the movement of levers 86—88 being limited to any one of three positions in the following manner:

If, as is shown in Fig. 11, there is no hole opposite the related plunger, said plunger will move but slightly before contacting the bar 82. The plunger being thus held from further movement, the related link 96 will also be held and, as rock lever 69 completes its forward movement, will act as a pivot point for the related positioning lever 93, said lever, under influence of spring 94, being raised and rocked about point 97 until stopped by means of projections 98 contacting the surface 99 of the related cam 74.

A small diameter hole opposite a plunger will allow said plunger to move until stopped by the larger diameter portion 106 contacting the bar 82, whereupon the plunger, through link 96, will control rocking of positioning lever 93 in a clockwise direction (Fig. 6) about point 92, to bring projection 98 beneath a suitable collar 120 on stud 110.

The large diameter hole opposite plungers 83—85 will allow said plungers to move their full distance, rocking levers 93 still further forward, whereupon the projection 98 will be controlled to contact surface 102 of the related cam 73.

The above described movement of the positioning levers 93 is adapted to position the cams 73 and 74 to either side of the path of movement of the roller 71, to bring certain surfaces of said cams into active relation with said roller for the purpose of rocking the gear segment 105 to set a related accumulator 473 into non-operative, add or subtract position.

Cams 73 and 74 are pivotally mounted upon the stud 110, fixed in the frame of the machine, cam 73 being normally tensioned for downward movement by the spring 111, and cam 74 tensioned for upward movement by said spring.

With the accumulator standing at non-operative position and the parts at normal, cams 73 and 74 will be positioned below roller 71 and gear segment 105 will be in its lower position, the surface 112 of cam 73 being held by spring 111 against a projection 113 of segment 105 and surface 114 of cam 74 against roller 71.

*Means for engaging the accumulator for addition (Figs. 2, 5, 6, 8 and 11)*

If the values to be printed in a given column are to be added upon an accumulator, the tubular bar 82 will have a small diameter hole opposite the related plunger 83, so that during forward rocking of arm 69 a pivot point 97 will be so located that continued forward movement of arm 69 will rock lever 93 and bring projection 98 against the collar 120, therefore exerting no influence upon cams 73 and 74.

Thus as roller 71 is carried forwardly spring 111 will rock cam 74 upwardly until surface 114 of said cam contacts a projection 115 of segment 105.

During return movement of arm 69 roller 71 will contact the surface 116 of cam 74 and rock said cam so that surface 114, acting against projection 115, will rock segment 105 upwardly, as shown in Fig. 6, sufficiently to rotate the accumulator control gear 474 in engagement therewith through approximately 90° of clockwise movement.

A rod 406 (Fig. 5) has universal joint connection with the accumulator control gear 474 and with the floating accumulator shaft 403 (Fig. 8), there being a collar cam 438 secured to each end of said shaft and provided with segmental portions 121 and 122.

The above described movement of the accumulator control gear 474 is adapted to rock the collar cams 438 and cause the portions 121 thereof to contact the surfaces 123 of cam plate 419 and thus rock the accumulator into engagement with the teeth of racks 610.

The cam plate 419 has connection through link 321 with an arm 322 of a rocker device 325, provided with two cam followers adjustable by key set control devices to different positions relative to cam arms 316 and 320, secured to rock shaft 301.

Normally these control devices are set (as in Fig. 8) to provide for additive registration, wherein the surface 123 of plate 419 is rocked free of the collar cams 438 to disengage the accumulator during the first part of an operative cycle of the machine, before the reciprocatory racks 610 are allowed to move, the plate being moved to reengage the accumulator while the racks lie in their extreme operated position, as fully described in the aforementioned patents.

Upon return movement of the racks the value set in the keyboard will be additively transferred to the accumulator.

*Means for engaging the accumulator for subtraction (Figs. 2, 5, 6, 8 and 11)*

If the register is to perform a subtractive operation a larger diameter hole in bar 82 will have been positioned opposite the plunger 83 to provide for displacement of the pivot point 97 of positioning lever 93 to bring the related projection 98 of said lever into cooperative position with the surface 102 of cam 73.

Thus during forward movement of arm 69, the projection 98 of lever 93, under influence of spring 94, will contact surface 102 and rock cam 73 upwardly, against tension of spring 111, to bring the surface 117 of said cam into active relation with roller 71. Cam 74 having been moved (or held) in raised position by the spring 111, the lower surface of both cams will lie in the path of movement of roller 71.

Return movement of rock arm 69 will now cause roller 71 to engage the surface 117 of cam 73, and surface 118, acting against projection 115, will give segment 105 its full movement to impart an approximate 180° clockwise rotation to the register control gear 474.

This movement of gear 474 is imparted to the collar cams 438 and will rotate said cams sufficiently to carry the portions 121 past the surface 123 of the cam plate 419, the accumulator thus remaining out of engagement with rack 610. However, the portions 122 of the collar cams will now be positioned opposite the surface 124 of the cam plate 419 and as said plate is rocked (through control means 325 and cam 320) the surface 124 of plate 419 will act against the portions 122 of the collar cams to engage the accumulators with racks 610 before said racks are allowed to move. Upon initial movement of racks 610 values set up on the keyboard will be negatively transferred to the accumulators, control means 325 acting while the racks lie in their extreme operated position to disengage the accumulators and allow said racks to return idly to their normal position.

*Means for holding the accumulator in non-operative position (Figs. 2, 5, 6, 8 and 11)*

If in a given columnar position of the carriage no operation is to be performed on the accumulator, bar 82 will have no recess opposite plunger 83 and said plunger, during subsequent movement of the rock arm 69, will control the location of projection 98 of lever 93 in engagement with the surface 99 of cam 74, continued forward movement of arm 69, through spring 94 and positioning lever 93, rocking cam 74 downwardly, against tension of spring 111. This will effect engagement of the surface 104 of said cam with the projection 113 of segment 105 and, cam 73 being rocked or held downwardly, against projection 113, by spring 111, the points 91 of both cams will be positioned below the path of movement of roller 71.

As rock arm 69 is returned to its normal position, the roller 71 will now contact the upper surface of cam 74 and rock said cam and gear segment 105 downwardly, whereupon accumulator control gear 474 will rotate the collar cams 438 to the non-operative position wherein the portions 122 are free of the surface 124 of plates 419 and the flat sides of portions 121 are opposite the surface 123 of said plates, the accumulator being in disengaged position.

During the rocking movement of the plate 419 incident to an operating cycle of the machine, surfaces 123 and 124 of said plate will remain inoperative relative to the collar cams 438 and the register will remain out of engagement with the racks 610 during their full operative movement.

*Means for shifting the platen carriage to successive columnar positions (Figs. 4–9)*

As shown in Fig. 7, a lever 147 is provided with a hook end 148 having engagement with projection 149 of a lever 150, pivotally secured at 62 to the bracket 29 as shown in Fig. 8.

As fully described in the aforementioned Patent No. 1,932,013, depression of an operating key will rock lever 147 to disengage hook end 148 from lever 150. Upon disengagement lever 150, under influence of spring 151, will be rocked out of engagement with the projection 152 of a pawl 153, pivotally mounted on the crank arm 155, allowing said pawl, under influence of its spring 156, to be rocked into engagement with a notched disk 157, fast to the hub 158 of gear 50 (Fig. 5) having drive connection with motor 48 as previously described.

During this movement of lever 150 the surface 159 of said lever will contact a stud 160, fast to the lever 61 and rock said lever downwardly to cause the insulated roller 63 (Fig. 7) fast thereto to contact the points 64 of the motor switch 65 and initiate an operating cycle of the machine.

During an operating cycle of the machine, crank arm 155, having link connection 161 with cam 316, fast to shaft 301, will impart reciprocating movement to said cam.

The reciprocating movement of cam 316 is adapted, through link 162 (Fig. 8), arm 163 and shaft 164 to operate the carriage releasing means shown in Fig. 4, in the following manner:

Pivotally mounted at 165 upon a bracket 166, suitably secured to the rear casing of the machine, is a bell crank lever 167 (Figs. 5, 6, 8 and 9) provided with a roller 168, held by tension of spring 169 against surface 170 (Fig. 9) of arm 171, loosely secured to a shouldered hub 172 of an arm 173 fast to the shaft 164.

Arm 173 is provided with a pin 174 having engagement with a slotted opening 175 of arm 171. During the forward movement of cam 316 said pin is carried downwardly and arm 171 is allowed to fall away from roller 168, allowing lever 167 to be rocked downwardly by spring 169.

A pin 176 fast to lever 167 has engagement with a lever 177 fast to a short shaft 178 mounted in bracket 166, said pin, during movement of lever 167, rocking lever 177 and shaft 178 in a clockwise direction as viewed in Fig. 8.

Secured to the shaft 178 is an arm 179 provided at its free end with a projection 180 (Figs. 4 and 8), adapted during movement of shaft 178 to be moved downwardly into latching engagement with the surface 181 of a spring tensioned latch pawl 182.

Upon return movement of cam 316, link 162 and arm 163 will rock shaft 164 counter-clockwise, as viewed in Fig. 8, and pin 174 of arm 173 will lift the lever 171 upwardly to cause the surface 170 (Fig. 9) of said lever, contacting roller 168 to rock the lever 167 clockwise about point 165 (Fig. 8), and pin 176 through lever 177 will rock shaft 178 counter-clockwise, to move the projection 180 of lever 179 upwardly, whereupon said projection, being in engagement with the surface 181 of latch pawl 182, will lift said pawl bodily.

Pawl 182 is pivotally mounted at 183 upon a trigger 184 secured by pin and slot engagement 185 to a bracket 186 fast to the rear frame of the machine.

As pawl 182 is moved upwardly trigger 184 will be carried upwardly therewith and spring 187 will rock said trigger to position its projection 188 above the projection 6 of lever 7. This rocking movement of trigger 184 will cause stud 189, fast to said trigger, to disengage the pawl 182 from projection 180 of lever 179, whereupon spring 187 will draw trigger 184 downwardly until stopped by surface 190 contacting a projection 192 of the bracket 186.

Downward movement of trigger 184, however, will cause projection 188 to disengage the projection 6 of lever 7 from the bar 1 (securing the carriage in columnar position as previously described), whereupon the carriage 5 will be free to move, under the influence of spring tensioned drum 8, until stopped by the projection 6 engaging the notch 2 in the bar 1 corresponding to the next columnar position, said engagement being adapted to operate the accumulator selecting mechanism as previously described.

During the above movement of the carriage the surface 193 of the tabulating bar 1 will contact the surface 194 of trigger 184, to rock said trigger from the projection 192 of bracket 186 and free projection 188 from projection 6.

Near the completion of an operating cycle a projection 370 of crank arm 155 (Fig. 8) will contact an arm 371 of lever 150 and rock said lever into the path of movement of projection 152 of pawl 153 to disengage said pawl from driving disk 157.

A cam shoe 196 (Fig. 4) suitably placed upon a transverse bar 195 of the carriage 5 is adapted, by co-operating with a roller 197 fast to an arm 198 secured to square shaft 199, to rock said shaft and thereby control suitable clutch means for returning the carriage to its initial position, as fully described in Patent No. 1,946,572.

*Total printing (Figs. 2, 7, 8 and 10)*

A total is taken by releasing the actuator segments and allowing them to rotate the accumulators subtractively until suitable zero stops on the accumulator wheels contact with fixed stop members. This will set the total in the type bars, and the hammers will be tripped to print the total. The bars 615 are then reengaged with the oscillating frame and during the return stroke of said frame are moved rearwardly to normal position, the accumulator wheels being disengaged from the racks before the return stroke is made, whereby the accumulator which has been totalized will remain at zero.

The machine is set for reverse or subtractive operation by contact of the total key lever 278 with a pin 352 (Fig. 7) on rocker control plate 326, the total key thus holding the plate out of the path of clockwise rotation of the forward cam follower, so that the accumulators will not be disengaged at the beginning of the operation, by the action of cam arm 320. On the return stroke of the parts, the forward cam follower, co-acting with cam arm 320, will disengage the active accumulator from the segments. The described setting of plate 326 also displaces the rear cam follower. At the end of the cycle of operation the pin 350, fast to reciprocating cam 318 (Fig. 8), will contact with arm 322 and restore rocker 325.

Depression of the total key 278 will not only trip the column latches 214 (Fig. 2), through pin 263 and rocker 227 (Fig. 10), but will also trip a latch 620, through operation of a control arm 621 pivotally connected to said latch. Latch 620 normally engages a lug on total segment 618 preventing movement of said segment under the influence of the total spring 681. Upon tripping of the latch, segment 618 will operate a shaft having a helically arranged row of pins 651 (Fig. 2) acting to trip the latching dogs 617 successively from right to left of the machine, the tripping of said dogs releasing the segments and also releasing stop members 613, so that they will fall into the path of the zero stops 457 on the accumulator wheels.

When this zeroizing operation has progressed to the left hand side of the machine, a pin 481 of a rearwardly extending arm of the total segment 618 will contact with a projection of a rod 130, connected at its other end to a trigger 131, adapted to release latch 148 and thereby engage the clutch as previously described. The machine being put in operation, frame 616 will carry the dogs 617 forwardly, so that they will snap under the stop members 613 and studs 659 of the segment levers. The hammers will now be tripped, and upon rearward movement of frame 616 the segments and total stops will be restored to normal position.

The total key is locked in depressed position by latch 223, and is released near the end of the cycle of motor operation by a finger of rock arm 163 (Fig. 8), driven by parts 162 and 316, and moving downward against a click pawl 222 of latch striker 220 (Fig. 10), the parts of the total setting mechanism thus being restored to normal position.

The mechanisms above set forth are all described in detail in the patents hereinbefore referred to.

Multiplying (Figs. 1, 7, 26 and 37)

The automatic multiplication mechanism of the present invention is of the type wherein a product is obtained by means of repeated additions or subtractions, the lower value multiplier digits being treated normally and the higher value digits complementally in known manner. The full multiplicand is set up on the keyboard 215 to the right of a suitable indicating marker 200 (Fig. 1), the complete multiplier being concurrently set upon the keys 215 to the left of said marker.

The platen carriage having been manually or automatically set to the proper columnar position, the program bar 82 will provide for non-operative condition of the accumulators 473, during a preliminary value installing cycle of operation.

The multiplier and multiplicand values having been set up on keys 215 and the carriage positioned, a multiplying key 201 is then depressed, being locked in depressed position by means of a spring tensioned latch 154 (Figs. 26 and 37).

Multiplying key 201, which is fulcrumed at 201a has link connection 202 with operating key 138 (Fig. 7), and upon depression will depress key 138 to release hook 148 from clutch lever 150, initiating a machine cycle in the manner previously described.

Multiplicand storage devices (Figs. 2, 7, 16, 20–28 and 34–37)

Thus, upon depression of the multiplying key, the machine will make a preliminary cycle during which bars 615 (Fig. 2) in any columns wherein a key 215 is depressed will be carried forwardly until stopped by engagement with the related keys.

During the forward movement of bars 615 projections 614 thereof will impart counter-clockwise rotation to related storage segments 203—203a, loosely mounted upon a transverse shaft 204 supported upon plates 205 (Fig. 34), the plates and shaft constituting a transversely shiftable factor carriage slidably supported upon transverse rods 206, 207 (Fig. 37).

Storage segments 203, normally related to the columns to the right of marker 200, are multiplicand storage members and are adapted to be locked in set position during the first portion of the return stroke of the setting cycle, prior to the return movement of stop bars 615, as follows:

Fulcrumed upon rod 208 (Fig. 7), fixed in the framing of the machine, is a lever 209 provided with a roller 210 lying in the path of movement of a double faced cam 211 secured to arm 316 of operating shaft 301. A forward arm of lever 209 is provided with a roller 212 (Fig. 16) adapted to engage a rearwardly extending arm of a bell crank lever 213 fast upon a square shaft 216 pivotally mounted by means of journal bearings in the plates 205 (Fig. 34) of the transversely shiftable factor carriage. Roller 210 of lever 209 is held in central position relative to cam 211 by spring tensioned fingers 217, as illustrated in Fig. 7.

As arm 316 moves forward cam 211 will rock lever 209 clockwise (for a purpose hereinafter set forth), roller 210 passing beneath cam 211 until released at the extreme forward movement of arm 316, whereupon arm 209 will again be centralized by fingers 217. Upon return movement of arm 316 cam 211 will impart counter-clockwise movement to lever 209, the roller 210 passing along the upper surface of said cam until released and centralized at the end of the cycle. Counter-clockwise movement of lever 209 will cause roller 212 to impart clockwise movement to bell crank lever 213 and shaft 216. Depression of multiplying key 201 having released a spring tensioned latch 302 (Fig. 37) permits engagement of said latch with the operated lever 213 to hold shaft 216 in rocked position during multiplication.

Fast upon shaft 216 is a locking bail 218 (Figs. 2, 28 and 34) extending across the multiplicand segments 203. Upon clockwise rotation of shaft 216 bail 218 will be rocked into engagement with the serrated forward edges of storage segments 203, locking said segments in set position.

The rear edges of the locked segments 203 form abutments against which bars 615 will be carried during each multiplying cycle, and serve to limit the movement of segments 610 in computing the product.

Multiplier storage mechanism (Figs 1, 7, 16, 20–28, 31, 33 and 34)

In the columns to the left of marker 200 are similar storage segments 203a upon which will be stored the multiplier in the same manner as described for the multiplicand. However, since during a multiplying operation segments 203a will be counted back step by step to their normal position, flexible locating means are provided for these segments, as follows:

For each order in the multiplier there is provided an arm 219 (Figs. 20, 33 and 34), supported upon shaft 216, and having pivotally mounted thereon at 221 a spring tensioned pawl 224 normally locked against pivotal movement by engagement of a projection 225 thereof with a notched seat 226 of related arm 228, loosely mounted in bearings 229 supported on shaft 216. A rod 230, extending transversely of the factor carriage, passes through each of the arms 219 and through bell crank lever 213 (Fig. 16) so that as said lever is rocked clockwise in the manner previously described, arms 219 and 228 will also be rocked in a clockwise direction, to bring projections 225 into locking engagement with the serrated edges of storage segments 203a. During operations (add, subtract, totaling etc.) in which the multiplying key is located in raised position latch 302 will be held inoperative and segments 203—203a are locked for a portion of such operations only. The locks are used and the locking action prolonged (shaft 216 being held rocked by special mechanism not pertinent to the present invention) to prevent displacement of the segments as bars 615 (Fig. 2) are moved forwardly during a negative total printing operation (described in Patent No. 1,915,296, issued June 27, 1933, to Loring P. Crosman). The following means are provided, however, operable when multiplying key 201 is in depressed position to disengage pawls 224 from the notches 226 during the installing cycle, so that the pawls are converted into flexible locating means.

Pivotally mounted upon shaft 231 (Fig. 16), mounted in the framing of the machine, is a lever 232 provided with a cam slot 233 having engagement with a pin 234 fast to multiplying key 201. The lower arm of lever 232 has link connection 235 with a finger 236 pivotally mounted at 237 upon arm 209. The upper end of finger 236 normally underlies the projection 238 of a rocker 239, pivotally mounted at 240 upon the right hand end plate 205 of the factor carriage. Upon depression of key 201 pin 234 will rock lever 232 counter-clockwise to position finger 236 beneath the projection 241 of rocker 239.

During the previously described clockwise movement of arm 209 by forward movement of arm 316 finger 236 will engage projection 241 to rock rocker 239 in a counter-clockwise direction.

This movement of rocker 239 will impart clockwise movement through suitable pin and slot connection 242 to an arm 243 pivotally mounted at 244 upon plate 205 (see also Fig. 31, in which directions of rotation are reversed). Arm 243 is provided with a pin 245 having engagement with a cam slot 246 of an arm 247 fast to rod 230. Clockwise movement of arm 243 will therefore impart counter-clockwise rotation (Fig. 16) to rod 230. A toggle spring 248 serves to hold the parts in adjusted position.

Fast upon rod 230 is a series of slotted collars 249 (Figs. 20, 28 and 33), the walls of the slots (shown in dotted lines) having engagement with shoulders 250 of the related arms 228. During the described counter-clockwise movement of rod 230 collars 249 will rock arms 228 clockwise around sleeves 229, disengaging notches 226 from projections 225 of the pawls 224. Upon disengagement, pawls 224, under influence of springs 251, will rock clockwise about point 221 until stopped by engagement of their projections 225 with the surfaces 252 of arms 228 as shown in Figs. 25 and 38 and illustrated by dotted lines in Fig. 21.

As previously described, return movement of arm 316 will impart clockwise movement through arm 209, to bell crank lever 213 (Fig. 16) and shaft 216, and as arms 219, mounted upon said shaft, are thus rocked rearwardly, pawls 224 will be carried rearwardly to bring the projection 225 of each pawl yieldably into engagement with one of a series of notches cut in the periphery of the related storage segment 203a.

Near the end of the return movement of arm 316 slide 191 (Fig. 2) will be moved forwardly, to release keys 215, by means of latches 214 operated by bail 227 through lever 163 (Fig. 8), as previously described, so that these keys will be released at the conclusion of the preliminary cycle.

*Means for releasing the factor carriage*
*(Figs. 7, 14, 15 and 18–37)*

The factor carriage 204, 205 (Fig. 34) is normally held in its right hand columnar position (with the units multiplicand storage segment 203 opposite the right hand stop bar 615) by means of a rack 254 (Fig. 26) pivotally mounted at 255 upon the forward framing of the machine. Rack 254 is provided with a series of serrations forming notches 256 corresponding to the columnar order of the digit keys in the multiplicand.

A roller 253 fast to the right hand plate 205 of the factor carriage is adapted to engage with notches 256 to secure said carriage in columnar position. Roller 253 normally has engagement with the right hand notch 256 of rack 254 and is adapted to be released to free the factor carriage during the set up cycle just described, in the following manner:

Upon depression of multiplying key 201, pin 234 (Fig. 14) fast thereto will rock bell crank lever 257 clockwise, releasing a spring tensioned pawl 258. Pawl 258 will rock counter-clockwise, carrying projection 259 into the path of movement of a latch 260 pivotally mounted at 261 upon a link 262. The forward end of link 262 is pivotally supported at 264 upon arm 265 loosely mounted upon shaft 266. The rearward end of link 262 is pivotally connected at 267 to cam arm 316 (Fig. 7) and during the forward movement of said arm link 262 will carry latch 260 forward of projection 259. Upon return stroke of arm 316 latch 260, engaging projection 259 will be thrown out of latching engagement with a spring tensioned pawl 268, also pivotally supported upon link 262 at 269. Thereupon pawl 268 will rock, bringing its roller 270 in front of projection 271 (Figs. 15 and 32) of a control plate 272, pivotally mounted upon stud 273 fast to the framing of the machine. Engagement of roller 270 with projection 271 during the return stroke of link 262 will impart counter-clockwise movement to control plate 272 to perform the operations hereinafter described.

Pivotally secured at 274 to an arm of control plate 272 is a link 275 connected at its lower end to rack 254 (Fig. 26), and as said plate is rocked as above described rack 254 will be rocked downwardly about pivot point 255, releasing roller 253, whereupon factor carriage 204, 205 will be free to move toward the left under influence of a spring 276, until stopped by engagement of a pawl 277 (Figs. 22, 27 and 30) with the face of the lowest order displaced storage segment 203a of the multiplier setting.

Pawl 277 is pivotally mounted at 279 upon a frame 280 forming a supplemental or multiplier counting out carriage (Fig. 35). Carriage 280 is slideably supported upon transverse shaft 266 fast to the framing of the machine and has also guiding engagement with shaft 206, being adapted to be moved along said shafts under influence of factor carriage 204, 205 in the ratio of 2 to 1, by means of differential gearing comprising a gear 282 (Fig. 26) fast to carriage plate 205 and having engagement with a toothed rack 283 fast to carriage 280 and a toothed rack 284 fast to the main framing of the machine as shown in Figs. 20 and 26. Thus it will be apparent that the supplemental carriage will be advanced, column by column relatively to the factor carriage, so that the multiplier storage segments 203a will be brought successively into control, the factor carriage itself being advanced to shift the multiplicand storage segments relatively to the stop bars 615 of the actuating segments.

In normal position of the factor carriage, pawl 277 is held away from the lowest order multiplier segment 203a, by means of a spring latch 285 pivotally mounted at 286 upon bracket 287 fast to the framing of the machine, and is released during the installing cycle of operation in the following manner:

Pivotally mounted at 288 (Figs. 24 and 39) upon an arm 289 fast upon shaft 216, and adapted to rock therewith, is a trigger 290. Trigger 290 is provided with a cam slot 291 having engagement with a pin 292 fast to the right hand arm 228. Trigger 290 is normally positioned beneath projection 293 of a tripper 294 (Fig. 36) pivotally mounted at 295 upon a frame plate 205 of the factor carriage.

Upon the initial clockwise movement of arms 228 imparted by slotted collars 249, pin 292 will cam trigger 290 upwardly to the position illustrated in Fig. 25. As shaft 216 is rocked in a clockwise direction as previously described, trigger 290 will engage projection 293 of tripper 294, rocking said tripper counter-clockwise about its pivot 295 to cause projection 296 of said tripper to disengage latch 285 (Figs. 27 and 30) from pin 297 of pawl 277 whereupon said pawl will be free to rock under influence of spring 298 until stopped either by the displaced units order multiplier member 203a or, if said member is not displaced, by a projection 299 of frame 280.

Pivotally mounted at 304 upon the under side of pawl 277 is a spring tensioned carriage locator latch 303 provided with a projection 305 normally in engagement with the right hand notch of a series of notches 306 columnarly spaced along the upper edge of a slide 307 supported upon studs 308 (Fig. 26) fast to the front framing of the machine. Slide 307 has link connection 309 with a latch 310 pivotally mounted at 312 upon a spring tensioned yieldable bracket 327 pivotally supported upon the framing at 328.

If a digit value is stored in the units multiplier segment 203a when rack 254 is released from roller 253, immediate shift of the carriages 204—205 and 280 will be prevented, as pawl 277 engages said storage member 203a and projection 305 remains in engagement with slide 307.

If the lower order segment is in zero position pawl 277 will be rocked counter-clockwise about pivot point 279 by spring 298, releasing projection 305 from slide 307, whereupon carriages 204—205 and 280 will be free to move toward the left when rack 254 is freed from roller 253 (pawl 277 passing through a notch 300 of segment 203a) as seen in Fig. 20, until relative movement of the carriages effects engagement of said pawl with the first active displaced member 203a. Upon engagement of pawl 277 with a member 203a said pawl will be rocked clockwise, to bring projection 305 of latch 303 into engagement with the notch 306 in the related column and the slide 307 into engagement with studs 308, whereupon the carriages will be held in proper adjustment during the computation of the first multiplier digit.

Figure 14:
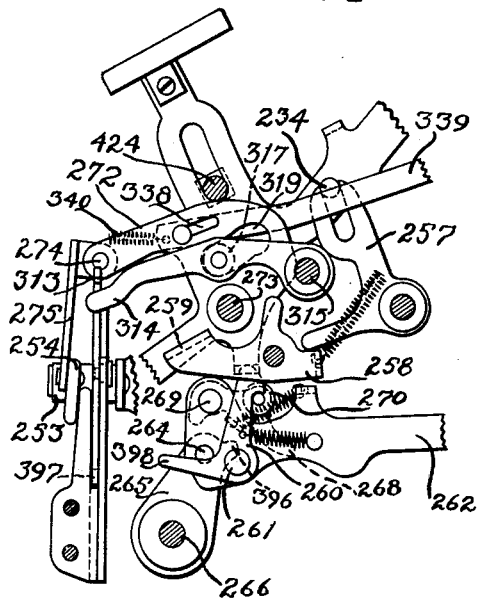
Fig. 14 is a detail right hand elevation of a control plate used for operating certain parts of the multiplying mechanism, the multiplying key being in normal raised position.

Upon release of projection 305 from slide 307, said slide will be allowed to move slightly toward the right, under influence of its spring 311, thereby rocking latch 310 clockwise to bring projection 313 thereof to a position overlying a finger 314 pivotally mounted upon stud 315 fast to the framing of the machine (Figs. 14 and 30).

Finger 314 has fast thereto a roller 317 having engagement with a suitable cam slot 319 of control plate 272.

Upon rocking movement of plate 272, to release rack 254 from roller 253 and allow the factor carriage to shift, finger 314 will be cammed upwardly, by means of slot 319 and roller 317, arm 314, in this movement camming past projection 313 of the displaced latch 310, the projection snapping back under arm 314 and thereby locking plate 272 temporarily in its rack disengaging position, against action of a spring tensioned bail 323 (Fig. 18) having link connection 324 with an arm of control plate 272.

Reengagement of projection 305 with slide 307 will effect movement of said slide toward the left under influence of the carriage spring 276, to disengage projection 313 of latch 310 from finger 314, whereupon plate 272 will be restored to normal raised position, under influence of spring 75 bail 323, reengaging a related notch 256 of rack 254 with roller 253 to lock the carriages in the new columnar position. At this time roller 270 of pawl 268 is held in a position (Fig. 14) lower than that of the partially operated position illustrated in Fig. 15, due to the movement of arm 265 about the center 266 and will not interfere with projection 271 of plate 272. It may be observed from Fig. 26 that the open ends of notches 256 of rack 254 are flared slightly to receive roller 253 and cam the carriages 204—205 and 280 slightly toward the right, to relieve the frictional engagement of pawl 277 with member 203a of the tension of the carriage shifting spring 276.

*Split printing (Figs. 1–3 and 7)*

Near the end of the forward stroke of the preliminary or installing cycle, the type hammers 715 will be tripped in the manner previously described, to print the multiplicand and multiplier values simultaneously upon the record sheet.

In this operation the zeros appearing to the right of the multiplicand and multiplier values set on the keyboard will be printed, owing to the provision of offset lugs 703 (Figs. 2 and 3) of the triggers 701, so that the triggers overlap each other from right to left and displacement of the higher order triggers will likewise displace all the lower order triggers.

There is, of course, no lug 703 immediately to the right of the units order multiplier trigger, but, since in the printing of products all the type hammers may be used, an alternative connection is provided, this connection being temporarily disabled, to prevent the multiplier zeros from merging with the multiplicand. Fast to a shaft 329, having link connection 330 (Fig. 7) with link 202, is an arm 331 (Fig. 2) engageable with one arm of a latch 332 forming a special connection between the trigger of the units order multiplier column and the highest order multiplicand trigger. In the normal position of the parts latch 332, which is secured upon the units order multiplier trigger, underlies a laterally bent lug 333 of the highest order multiplicand trigger, to operate the latter in the same manner as lug 703 of the other triggers.

Upon depression of multiplying key 201, however, link 202 in moving rearwardly will rock shaft 329 counterclockwise, whereupon latch 332 will be displaced from beneath lug 333, so that the tripping of the triggers to the left will not trip the triggers to the right of said column.

The multiplicand and multiplier values having been printed, the type bars 611 will be restored during the return stroke of the machine, during which stroke the platen carriage 5 will be released and shifted until stopped by engagement of a suitably spaced notch 2 of tabulating bar 1 with the projection 6, in the manner previously described.

During the shifting of platen carriage 5 lever 20 will again be oscillated to trip the register control clutch 24 and, there being a small diameter hole 81 of tube 82 opposite the plunger 83 and no holes opposite plungers 84, 85, the accumulator controlled by plunger 83 will be set for add, while the accumulators controlled by plungers 84, 85 will be set in non-add condition. Obviously, if desired, the tube 82 might provide for subtraction in the active accumulator.

The accumulator having been properly positioned, the machine will now perform a plurality of multiplying cycles in the following manner:

*Clutch control means for repeat cycles (Figs. 5, 7, 8, 14 and 26)*

As previously described, depression of multiplying key 201 will release hook 148 from clutch lever 150 to initiate a machine cycle.

Link 202 (Figs. 7 and 37) fast to key 201 is provided with a projection 334 normally overlying the forward end 335 of a spring tensioned latch 336. Projection 334 normally holds latch 336 free of shoulder 337 of hook 148. Rearward movement of link 202 upon depression of key 201, however, will carry projection 334 rearwardly, releasing latch 336, and as hook 148 is rocked clockwise in the manner previously described, latch 336 falling behind shoulder 337 will latch hook 148 free of the projection 149 of clutch lever 150.

Control of clutch lever 150 will now be extended to a secondary hook 148a, under control of plate 272, in the following manner:

Plate 272 has pin and slot connection 338 with a link 339 (Figs. 7 and 14) pivotally connected at its rearward end with the hook 148a. In the normal position of control plate 272 hook 148a is held free of projection 149 of clutch arm 150, as shown in Fig. 7. Upon counter-clockwise movement of plate 272 during the installing cycle, however, link 339, under influence of a spring 340 (Fig. 14) will rock hook 148a downwardly against the upper surface of projection 149 of lever 150 (lever 150 having previously been tripped by operation of key 201). Near the completion of the installing cycle, projection 370 of crank arm 155 will restore lever 150, whereupon hook 148a will engage the projection 149, latching said lever in inoperative position. As previously described, control plate 272 will be held in operated position by means of finger 314 until released by engagement of pawl 277 with the right hand active multiplier storage member 203a. Upon restoration of plate 272 to normal position hook 148a will be disengaged from lever 150, but lever 150 will be held in inoperative position until completion of the platen carriage shift by means of a lock 341 (Figs. 5 and 8) under control of plate 33 of the register control mechanism. Upon completion of the carriage shift, operation of plate 33, previously described, will lift lock 341 from engagement with projection 342 of clutch lever 150, allowing the clutch lever a limited movement to position under the lock and against the face of the plate. Upon operation of restoring cam 55 plate 33 will move away from lever 150 to start a machine cycle.

In order that lock 341 may be held inoperative during the succeeding multiplying calculation, the following means are provided:

As previously described, depression of the multiplying key 201 will move link 202 rearwardly. Rearward movement of link 202 (Fig. 7) will move a projection 402 of said link rearwardly of an arm 404 fast to shaft 405 and having spring connection 407 with projection 402. Arm 404 and shaft 405 will thus be urged in a counter-clockwise direction as viewed in Figs. 7-9 and in a clockwise direction in Fig. 6.

Fast to shaft 405 is an arm 408 (see also Fig. 5) having pivotally mounted thereon at 409 a spring tensioned latch 410 normally adapted to engage with the shoulder 411 (Fig. 8) of offset projection 412 of arm 171, thereby preventing movement of shaft 405 at this time. As arm 171 is rocked downwardly during the forward stroke of a machine cycle, shoulder 411 will be carried downwardly, out of engagement with latch 410, but projection 412 will now be positioned rearwardly of a projection 413 of arm 408 (Fig. 9), allowing only a slight movement of said arm, sufficient to bring the surface 414 of latch 410 into the path of return movement of shoulder 411. Thus, near the end of a return stroke of the machine cycle shoulder 411 will engage surface 414, rocking latch 410 upwardly, and as projection 412 is moved free of projection 413 arm 408 and shaft 405 will be rocked by spring 407 in a counter-clockwise direction (Figs. 8 and 9) sufficiently to bring projection 413 rearwardly to a position beneath shoulder 411 of offset projection 412, remaining in this position until restored by projection 402 of link 202 upon restoration of the multiplying key 201 as hereinafter described.

Arm 404, fast upon shaft 405 as stated, is provided with a lug 490, overlying an arm 491 loosely mounted on said shaft, arm 491 being connected by link 492 with a spring urged latch 493 (Figs. 5 and 10), pivotally mounted upon the frame 29. Latch 493 is designed to move over the left hand end of the intermediately pivoted lock 341. Latch 493 is normally held inactive, against the tension of its spring, by lug 490 and shaft 405, and is released, near the end of the set up cycle, by the rocking of said shaft.

At this time, however, the right hand end of lock 341 has already fallen behind clutch lever 150, so that the left hand end of the lock is raised, into the path of movement of the head of the latch. Upon restoration of lock 341 to normal position, after the shifting of the platen carriage, the lock will be engaged by latch 493 and held inactive during the calculation of the product.

Cycling having been started, the machine will now continue to operate until plate 272 is again rocked by release of a multiplier storage member 203a from pawl 277, as said member 203a is restored to normal in the following manner:

*Multiplying cycles counting mechanism (Figs. 16, 17, and 20-28, 30, 32, 33, 35 and 41)*

A sleeve 343 (Figs. 20, 28, 33 and 35) rotatably and slidably mounted upon the shaft 266 and lying between opposed end lugs of supplemental carriage 280 has fast thereon a counting finger 344. The forward end 345 of said finger overlies a transversely extending bail 346, pivotally supported upon the left and right hand end of the fixed shaft 266. Pivoted at 347 (Figs. 17 and 32) upon reciprocating link 262 is a pawl 348 provided with a pin 349 having engagement with cam slot 351 of a lever 353, fulcrumed upon stud 354 fast to the framing of the machine. A projection 355 of lever 353 has engagement with rod 230 of bell crank lever 213 (Fig. 16) which during the forward movement of an installing cycle will hold said lever 353 and pawl 348 in the position shown in Fig. 17, wherein said pawl in the forward movement of link 262 will be carried forwardly over a pin 356 (see also Fig. 32) fast to a rearwardly extending arm of the transverse bail 346.

During the return movement of the parts bell crank lever 213 will be rocked clockwise and rod 230 will be carried downwardly, away from projection 355, whereupon lever 353 will be free to rock, under influence of spring 357, until stopped by engagement with pin 234 of the depressed multiplying key 201.

The above movement of lever 353 is adapted, through slot 351 and pin 349, to cam pawl 348 counter-clockwise about point 347, to bring a suitable notch 358 of said pawl into cooperating position with the pin 356, so that upon subsequent operations of link 262 pawl 348 will impart reciprocatory movement to bail 346 (Fig. 41) and the spring retracted counting finger 344.

Pivotally mounted at 359 (Figs. 20 and 33) upon and forming an adjustable extension of counting finger 344 is a pawl 360, normally held in centralized position by means of toggle spring 361. Pawl 360 is provided with a projection 362 adapted during operation of counting finger 344 to engage with the teeth of the related multiplier storage member 203a to advance said member step by step either in a clockwise or counter-clockwise direction during the forward stroke of the machine, according to the setting of a switch 363 as hereinafter described.

Thus during each multiplying cyclic operation of the machine storage member 203a will be advanced until pawl 277 is released from engagement with said member, as notch 300 is brought opposite pawl 277 during clockwise movement of said member or until surface 364 is rocked free of said pawl during counter-clockwise movement.

*Additive cycles (Figs. 14-30, 32, 33, 34 and 35)*

Slidably and pivotally supported upon shaft 266, between sleeve 343 and the framing of supplemental carriage 280 (Figs. 28 and 30) is a feeler 365 (Figs. 20 and 33) having a forwardly extending arm 366 (Fig. 20) overlying a transverse bail 367 loosely mounted upon the right and left hand end of shaft 266. Feeler 365 has a projection 368 adapted to cooperate with the surface 369 of a spur arm of one of a series of switches 363 in the following manner:

Switches 363 (which are of U shape) are pivotally mounted upon shaft 204 of the factor carriage and are provided with cam slots 372 (Fig. 23) having engagement with studs 373 fast to fingers 374 (Fig. 29) loosely mounted upon shoulders on the right hand end of spacing sleeves 229 (Fig. 26). Each finger 374 is held under influence of a spring 375 (Figs. 20 and 33) against a projection 376 of arm 219 mounted upon square shaft 216. As shaft 216 is rocked clockwise, at the beginning of the return stroke of the preliminary or installing cycle, arm 219 will be rocked therewith, and, if member 203a is positioned for a digit value of from 0 to 4, finger 374 under influence of spring 375 will also rock clockwise with arm 219 until stopped by engagement of its projection 378 with rod 379, secured to the left and right hand plates 205 of the factor carriage. During clockwise movement of a finger 374 pin 373, through cam slot 372, will rock the related switch 363 counterclockwise, bringing the surface 369 of said switch into relation with projection 368 of feeler 365, as shown in Fig. 21.

Bail 367 has pin and slot connections 380 (Figs. 18 and 19) with link 381, pivotally connected at 382 with an arm of control plate 272 and, during the counter-clockwise movement of said plate previously described, link 381 will be carried downwardly, rocking bail 367 slightly in a counter-clockwise direction.

Fulcrumed upon shaft 266 is a block lever 383, normally lying in the path of movement of a projection 384 of an arm 385 (see also Fig. 40) pivotally mounted upon stud 273 and having link connection 386 with the rocker control plate 326 (Fig. 7) previously described. Arm 385 is normally held against clockwise rotation under influence of spring 387 by engagement of projection 384 with block lever 383.

Pivotally secured upon the right hand end of transverse rod 206 is a bell crank lever 388, the lower end of which is normally held in engagement with a projection 389 of block lever 383, under frictional contact of said projection and counter-clockwise influence of toggle spring 390, having one end secured to projection 391 of lever 232.

As previously described, upon depression of multiplying key 201 lever 232 will be rocked counter-clockwise, whereupon projection 391, being carried downwardly, will cause spring 390 to induce clockwise movement of bell crank lever 388.

Block lever 383 is normally held against counter-clockwise movement exerted by spring 392 by means of pin 380 mounted in bail 367. During the slight counter-clockwise movement of bail 367 just described, however, pin 380 will allow block lever 383 also to move slightly, releasing projection 389 from bell crank lever 388, whereupon said bell crank, under influence of toggle spring 390 will be moved free of projection 389, to the position illustrated in Figs. 19 and 40.

As previously described, control plate 272 will be locked in rocked position until released by engagement of pawl 277 with one of the storage members 203a during a shifting movement of the carriage 205, whereupon said plate will be restored to its normal position. Upon restoration of plate 272 link 381 will no longer restrain bail 367 from rocking in a clockwise direction, under influence of spring 393 (Fig. 21). However, surface 369 of switch 363 having been positioned rearwardly of projection 368 of feeler 365, bail 367 and block lever 383 will be held against clockwise movement, so that the rocker devices 325 will remain in their normal additive position, to provide for normal operation, in accordance with the setting of the individual accumulators, during subsequent cycles of the machine. These rocker devices operate in well known manner and are clearly described in the aforementioned patents.

Switch 363 is provided at the forward end thereof with opposed cam surfaces 394, 395, and as finger 374 is rocked rearwardly surface 394 will be positioned rearwardly of the projection 362 of counting finger pawl 360, as seen in Fig. 21. Therefore, as counting finger 344 is rocked, projection 362 will engage surface 394 and will be guided upwardly against the serrated edge of member 203a and as said projection completes the full extent of its movement, illustrated in Fig. 21 in dotted lines, will advance member 203a clockwise one step. The machine will thus continue to run additively until member 203a is restored to normal, whereupon, slot 300 having been brought opposite pawl 277, control plate 272 will again be operated, in the following manner:

As previously described control plate 272 is rocked by pawl 268 (Figs. 14, 15 and 32) during an installing cycle through the tripping of latch 260 by the projection 259 of pawl 258. During the forward stroke of a subsequent operating cycle, however, the pawl 268 will be reengaged with latch 260 by projection 396 of arm 265 (Fig. 41).

Upon the release of pawl 277 from member 203a by the action of the counting finger, latch 310 will be rocked clockwise (Figs. 26 and 30), bringing a projection 397 of said latch into the path of downward movement (about center 266) of a forwardly extending arm 398 of latch pawl 260. As latch pawl 260 is carried forwardly during this same cycle arm 398 will engage projection 397, latch 310 yielding counter-clockwise and snapping to position above arm 398 near the extreme forward and downward movement of said arm.

During return movement of the parts arm 398 will engage the under surface of projection 397 of latch 310, causing latch 260 to be rocked counter-clockwise, releasing pawl 268, and roller 270 (engaging projection 271) will rock control plate 272, releasing the factor carriage. Upon completion of the carriage movement latch 310 will release finger 314 and control plate 272 will be restored in the manner previously described.

Since bell crank 388 (Fig. 19) remains in rocked position, restoration of control plate 272 will allow bail 367 to rock, bringing projection 368 (Fig. 21) of feeler 365 against or below the surface 369 of the next higher order switch 363 to determine the character of the next registering operation.

Figure 17:
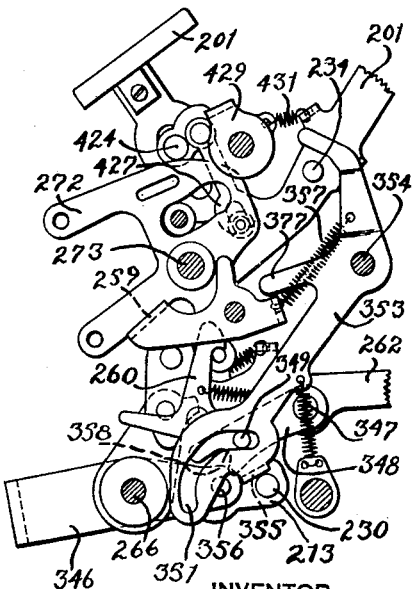
Fig. 17 is a right hand elevation of operating means for the multiplier counting finger, the multiplying key being in depressed position.

During the control of latch 260 by latch 310 (that is to say, during the computation of the product), projection 259 of pawl 258 will be held in inoperative position by means of projection 377 of levers 353 (Fig. 17).

*Subtractive cycles (Figs. 18, 19, 21–23 and 33)*

Fast to the left hand face of each of the multiplier storage members 203a is a shoe 399 adapted in the preliminary setting of the members 203a to any digit value from 5 to 9 to be positioned rearwardly of finger 374 as shown in Figs. 22, 23. For any digit values 5 to 9 of the multiplier therefore finger 374, when released by clockwise movement of arm 219 during the installing cycle, will be held by shoe 399, so that pin 373 will hold switch 363 in normal raised position, as shown in Fig. 22, wherein cam surface 395 of said switch will be opposite projection 362 of counting finger pawl 360. Upon operation of counting finger 344 therefore projection 362 will be cammed downwardly along the surface 395 of switch 363 into engagement with the upper surface of a serration of multiplier storage member 203a, advancing said member one step forwardly. Member 203a will continue to be advanced step by step during succeeding cycles until surface 364 is brought below pawl 277, (giving a mutliplier action equivalent to the complement of the digit set up), whereupon control plate 272 (Fig. 18 and others) will again be operated to shift the factor carriage to the next higher order column.

During the above described operation, switch 363 being held in raised position, surface 369 will remain above the path of movement of projection 368 of feeler 365, so that said feeler will be free to rock in a clockwise direction during restoration of control plate 272 (Figs. 18, 19) and, bell crank 388 being free of projection 389, bail 367 and block lever 383 will be rocked clockwise under influence of spring 393 (Fig. 21), carrying the rearward surface of block lever 383 downwardly free of projection 384 of arm 385. Upon release of projection 384 from block lever 383 arm 385 will be rocked clockwise about pivot point 273, under influence of spring 387. Clockwise movement of arm 385 through link 386, will rotate rocker control plate 326 clockwise, against tension of spring 482 (Fig. 8), to set the rocker devices 325 for subtractive or reverse operation. The parts will remain set in subtract position until the succeeding counterclockwise movement of plate 272, when said plate will contact with a laterally offset finger 385' (Fig. 18) of arm 385, restoring said arm and allowing block lever to return to restraining position.

*Short-cut tens (Figs. 21–25 and 33 and 38)*

According to the semi-complemental shortcutting system of registration hereinbefore referred to, the higher order multiplier digits effect a registration of seven (for example), as +10, −3, the value 10 being provided for as follows.

As previously described, during the preliminary installing cycle arms 228 are rocked partially by means of slotted collars 249, bringing projections 225 of pawls 224 against surfaces 252 of said arms (Figs. 25 and 38). Also, arms 228 are further rocked in a clockwise direction, and projections 225 of pawls 224 are moved by arms 219, each into engagement with the serrated forward edge of a multiplier storage member 203a (Figs. 21 and 22). Each switch 363 is provided with a surface 400 adapted to govern the engagement of projection 225 with the teeth of member 203a of the next higher order column (Fig. 33), providing for the adding in of the value ten from which the complement of a multiplier digit is to be subtracted.

In any column in which the multiplier storage member 203a has been set to a value of 1 to 4, switch 363 in moving downward will bring a cam surface 400 thereof into the path of movement of projection 225 of the pawl 224 of next higher order. Rearward movement of pawl 224 will therefore bring projection 225 into contact with surface 400, the friction of the parts causing the pawl to pivot about point 221 as the switch continues its downward movement. When switch 363 reaches the limit of its movement, projection 225 will cam off the surface 400 and drop between the teeth of member 203a, having been guided idly past a tooth thereof, from the dotted line to the full line position shown in Fig. 21.

In a column wherein a multiplier value of 5 to 9 has been set into the storage member 203a, however, switch 363 is prevented by shoe 399 from moving surface 400 into the path of movement of projection 225, and as pawl 224 is carried rearwardly from the position shown in Fig. 23, projection 225 will engage a tooth of the higher order member 203a and advance the member one step in an additive or counter-clockwise direction, to the position shown in Fig. 22. This movement modifies the previous setting of the higher order member, adding 1 to a member standing at 0–4 and providing for one less subtraction of a member standing at 5 to 9 (−5 to −1). It may be noted that the advance of a higher order member 203a by projection 225 will not disturb the setting of the switch 363 in said higher order, even though the registration is changed from 4 to 5, since in this case finger 374 will be moved to the far side of shoe 399 before member 203a is moved. Therefore, a higher order digit of 4, advanced to 5 as stated, will have a value of +5, and no further carrying up to a succeeding higher order will be necessary.

*Means for rendering the keyboard clearout and platen carriage shifting mechanisms inoperative during multiplying cycles (Figs. 2, 5–9)*

As has been seen, keys 215 will be restored during the installing cycle through operation of the column latches 214, said latches again reengaging stop bars 615 as said bars are returned to rearward position. The following means is provided to render the universal clearout mechanism inoperative during the multiplying cycles, so that the stop bars and segments 610 will not be released in those columns not related, by the shifted position of the factor carriage, with the multiplicand setting.

As described under the caption "Clutch control means for repeat cycles," shaft 405 and arm 404 are rocked counter-clockwise from the position illustrated in Fig. 8, this movement occurring near the end of the setting cycle and the parts being held in rocked position until the multiplier key is restored.

Counter-clockwise movement of arm 404 will cause a projection 415 (Fig. 8) of said arm to move a slide 416 rearwardly. Slide 416 is provided with a projection 417 adapted in the rearward movement of said slide to rock hook 418 (pivotally mounted at 420 upon plate 421 of the clearout mechanism) out of cooperation with pin 263 of bail 227, thus rendering the clearout mechanism inoperative during operation of plate 421 by lever 163 as previously described.

Also, projection 413 being beneath shoulder 411, arm 171 will be held in raised position, thereby rendering the platen carriage shifting mechanism (Fig. 4) inoperative.

*Means for releasing column latches in multiplicand columns (Figs. 2, 15–17, 20 and 26–27)*

As stated, the multiplicand values are stored during the installing cycle upon storage devices 203 supported in the right hand side of the factor carriage 204, 205.

Since the multiplicand is accumulated upon the accumulators 473 during each multiplying cycle of the machine, the column latches 214 controlling stop bars 615 in the multiplicand columns must be released, this being accomplished as follows:

The forward end of each clearout slide 191 (Figs. 2, 20, 26 and 27) is provided with a projection 422, lying forwardly of a bail 423 extending transversely of the multiplicand digit columns, and slideably mounted upon a square shaft 424 suitably supported in the main framing of the machine. Bail 423 is provided with a slotted projection 425 embracing one of the frame plates 205 of the factor carriage and as said carriage is shifted from column to column bail 423 will be shifted therewith.

Fast upon the right hand end of shaft 424 is a crank arm 426 (Figs. 15–17 and 26, 27) having link engagement 427 with control plate 272.

Shaft 424 is normally held against clockwise rotation induced by spring 428 (Fig. 20) by means of lock 429 (Figs. 16 and 26) pivotally mounted upon rod 430, fast in the framing of the machine. Lock 429 has toggle spring connection 431 with multiplying key lever 201 and is urged counter-clockwise in the normal raised position of said lever. Upon depression of multiplying key 201 the tension of toggle spring 431 will induce clockwise rotation of lock 429.

Figure 15:
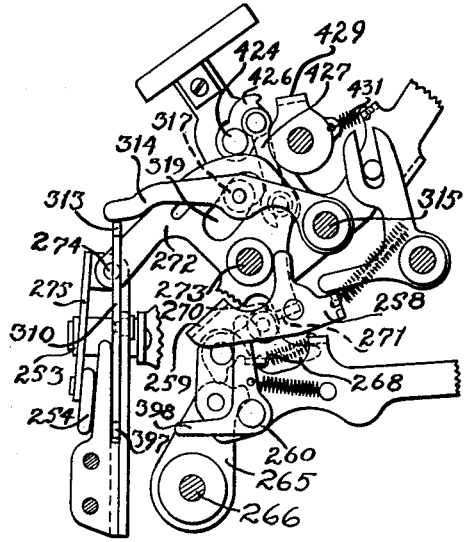
Fig. 15 is a similar view taken during the return stroke of a cycle, showing the multiplying key and the control plate in operated position.
Figure 16:
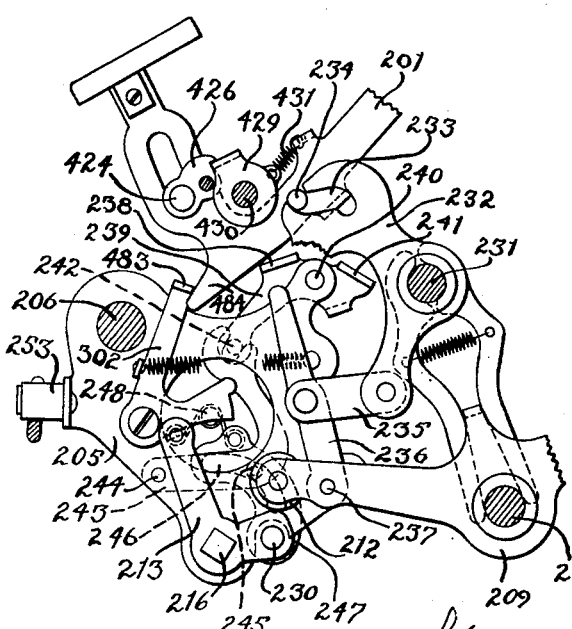
Fig. 16 is a right hand elevation of control means for the multiplier storage blocking devices.

As previously described, during the installing cycle control plate 272 will be rocked counter-clockwise about fulcrum 273, whereupon link 427 will rock crank arm 426 slightly counter-clockwise, releasing lock 429 and thus allowing said lock to be moved out of position of engagement with crank arm 426, as shown in Fig. 15.

Release and positioning of factor carriage 204, 205 will restore control plate 272 to normal position, and as said plate is restored crank arm 426 and shaft 424 will be allowed to move clockwise beyond normal position, whereupon bail 423, engaging projections 422 of slides 191, will release column latches 214 of the stop bars 615 related at the time to the multiplicand columns.

Since the multiplicand storage members 203 are mounted on the shiftable carriage 204, 205 and the accumulators 473 are mounted in the fixed framing of the machine, bail 423 will act on successive higher order columns of slides 191 as carriage 205 is shifted from right to left.

As previously described, control plate 272 will be latched in operated position while carriage 205 is shifting, and bail 423 will therefore be held in counter-clockwise position, free of projections 422 during the shifting operation.

*Non-printing control means (Figs. 6 and 9)*

The following means are adapted to prevent printing during the multiplying cycles:

Pivotally mounted upon the framing at 432 is a bail 434 having link connection 435 with lever 408, and as said lever is rocked clockwise (Fig. 6), bail 534 will be rocked downwardly, into engagement with a hook end 456 of bail 707 extending transversely of and lying in the path of movement of the type hammers 715, thereby preventing operation of said hammers.

*Means for restoring the factor carriage (Figs. 4, 7, 8, 21 and 28)*

Fast to the framing 205 of the factor carriage is a toothed rack 433 (Figs. 21 and 28) having gear connection 437 with a link 439 pivotally connected at 440 to a rocker 441, pivotally secured at 442 to the bottom framing of the machine. As carriage 204, 205 is shifted toward the left, rocker 441 will be rocked in a clockwise direction as viewed in Fig. 28.

Rocker 441 is provided with a projection 443 adapted to engage a projection 444 of a latch 445, pivotally mounted upon the framing at 446, this engagement occurring as the carriage 204, 205 completes its movement toward the left, after having been released in the last computing zone.

Latch 445 has engagement through projection 447 with a spring tensioned arm 448.

Clockwise movement of rocker 441 will rock latch 445 in a clockwise direction, thereby moving projection 447 out of engagement with arm 448, whereupon said arm, under influence of spring 449 will be rocked counter-clockwise about its fulcrum 450. Fast to arm 448 is an insulated roller 451, having engagement with a clutch lever 452 also fulcrumed upon the bottom framing at 450. Counter-clockwise movement of arm 448 will thus rock clutch lever 452 counter-clockwise to permit engagement of a one cycle clutch 453 (similar to clutch 24 previously described), driven through drive shaft 41. Clutch 453 has bevel gear connection 454 with a bevel gear 455, rotatably mounted at 456 upon a bracket 458 fast to the bottom framing of the machine.

Since during a factor carriage shifting operation control plate 272 will be latched in rocked position, and hook 148a (Fig. 7) will thus hold clutch lever 150 in inoperative position, thereby disengaging contact 64 of switch 65, insulated roller 451 of arm 448 is adapted to engage the contacts of a subsidiary switch 459 in a parallel circuit through electric motor 48, by means of which motor gear 455 will be driven in a clockwise direction.

During clockwise movement of gear 455 a roller 460, mounted thereon, will trip a pawl 461 having connection by means of a Bowden cable 462 with a spring tensioned trigger 463 (upper right hand corner, Fig. 8) provided with an extension 464 underlying a projection 465 of the platen carriage positioning lever 7 (Fig. 4).

As previously described the platen carriage 5 is prevented from shifting during multiplying cycles by operation of lever 408 (Fig. 8). Tripping of pawl 461 will, however, rock lever 7 to release projection 6 from bar 1, whereupon the carriage 5 will be moved to a third position. The carriage in moving to this position is now properly located for the printing of the product, the program mechanism previously described providing for one of various combinations of accumulator control, such as transfer of the total to another accumulator (effected by setting said accumulator for addition during the total taking).

Continued clockwise rotation will cause roller 460 to engage the surface 466 of the operated rocker 441, restoring said rocker to normal position and through link 439, gearing 437 and rack 433 restoring the factor carriage to its right hand position. Near the end of the clockwise movement of gear 455 roller 460 will engage a bell crank lever 467 fulcrumed at 468, rocking said bell crank counter-clockwise, whereupon roller 469, mounted thereon, will engage surface 470 of arm 448, restoring said arm to normal latched position and releasing switch 459 and clutch lever 452, whereupon lever 452 will act to disengage clutch 453 as said clutch moves to full cycle position.

*Automatic total means (Figs. 2, 7, 10, 26 and 28)*

The product will be printed by an automatically initiated totaling operation, as follows:

Fulcrumed at 471 upon bell crank lever 467 (Fig. 28) is a lever 472 connected by means of spring coupling 475 with a bell crank lever 476 (Fig. 7) fulcrumed at 477 upon the right hand framing of the machine. Bell crank lever 476 has link connection 478 with the total key 278. During the counter-clockwise movement of bell crank lever 467, lever 472 will be carried therewith and projection 479 of said lever will engage a projection 480 of the restored rocker 441 and will fulcrum thereon to move spring coupling 475 in the direction indicated by arrow, rocking bell crank 476 counter-clockwise and depressing the total key 278 to thereby release total segment 618 (Fig. 10) in the manner previously described.

During operation of total segment 618 pin 481 mounted thereon will depress rod 130, releasing hook 148 to initiate a total printing cycle, said hook having been reengaged with lever 150 upon restoration of multiplying key 201, and said key having been restored by the tripping of latch 154 (Fig. 37) as the factor carriage 204, 205 is restored to its extreme right hand position. Restoration of multiplying key 201 moves slide 202 forwardly, projection 334 engaging forward end 335 of latch 336 to disengage said latch from shoulder 337, whereupon hook end 148 will reengage lever 150.

During forward movement of slide 202 link 330 will restore shaft 329 and arm 331 (Fig. 2) of the split clearout mechanism, whereupon latch 332 will reengage projection 333 of trigger 701 to provide for a full capacity tripping of hammers 715 to print zeros to the right of the first significant digit.

*Means for restoring the parts to normal (Figs. 15, 16 and 26–28)*

The following means are adapted upon restoration of the factor carriage 204, 205 to restore control plate 272 and associated parts to their normal positions.

As previously described, during a carriage shifting operation control plate 272 is latched in operative position by finger 314 (Fig. 15).

As roller 460 (Fig. 28) is moved beyond the surface 466 in the restoration of rocker 441 control plate 272 is in rocked position and factor carriage 204, 205 will be free to move toward the left under influence of spring 276. However, pin 297 (Figs. 27 and 30) having reengaged latch 285, projection 305 will be caused to reengage the right hand notch 306 of slide 307, so that a slight leftward movement of the factor carriage will move projection 313 (Fig. 26) of latch arm 310 from beneath finger 314, whereupon control plate 272 will be restored to normal position by means of spring tensioned bail 323 (Figs. 18 and 19).

Upon restoration of control plate 272 rack 254 (Fig. 26) will be reengaged with roller 253 of the factor carriage and, multiplying key 201 having been restored as previously described, the parts will now have assumed normal position.

As the factor carriage is restored to its right hand position a projection 483 (Fig. 16) of latch 302 will be positioned opposite projection 484 of the depressed multiplying key 201. Restoration of key 201 will, therefore, trip latch 302, releasing bell crank lever 213, whereupon shaft 216 will be rocked counter-clockwise under influence of a suitable spring (not shown) rocking locking bail 218 and pawls 224 out of engagement with storage members 203—203a, so that said members will be restored to zero position under influence of their springs 485 (Fig. 22).

Restoration of key 201 will also restore finger 236 (Fig. 16) to position beneath the projection 238 of rocker 239, and during the first cycle of any subsequent operation not involving the multiplying key 201, finger 236 will rock rocker 239 to rotate rod 230 and collars 249 (Fig. 20) and thereby reengage projections 225 of pawls 224 with notches 226 of arms 228.

From the preceding description it will be seen that, after the factors have been set in the keyboard, the depression of a single multiplying key will insure the printing of said factors, the calculation of the product, and the subsequent printing of said product by means of the same type used in printing the factors.

I claim:

1. In a multiplying calculator having an accumulator, cyclically operable registering means therefor, a keyboard, value retaining devices including multiplier storage members, and means for alternately shifting the value retaining devices and accumulator relatively to each other and effecting cycling of the registering means under control of said storage members; means responsive to a single manipulation to condition the machine for multiplication and obtain the product of two factors set in the keyboard, including a multiplying key, control means operable by said key to initiate a single cycle of operation of the registering means, means conditioned by said multiplying key and operable by the registering means to transfer a multiplier value set in the keyboard to the storage members and to transfer a multiplicand value set in the keyboard to the retaining devices, and means conditioned by said multiplying key and operable by the registering means at the end of said single cycle to initiate operation of the shifting and cycling means.

2. In a multiplying calculator having an accumulator, cyclically operable registering means therefor, a keyboard, a normally restrained spring urged factor carriage, value retaining devices mounted in said carriage and including multiplier storage members, and means for repeatedly locating the factor carriage relatively to the accumulator and effecting cycling of the registering means under control of said storage members; means responsive to a single manipulation to condition the machine for multiplication and obtain the product of two factors set in the keyboard, including a multiplying key, control means operable by said key to initiate a single cycle of operation of the registering means, means conditioned by said multiplying key and operable by the registering means to transfer a multiplier value set in the keyboard to the storage members and to transfer a multiplicand value set in the keyboard to the retaining devices, and means conditioned by said multiplying key and operable by the registering means at the end of said single cycle to release the factor carriage and initiate operation of the locating and cycling means.

3. In a multiplying calculator having an accumulator, registering means therefor, and a plurality of devices settable to effect a multiplying calculation; means operable to condition the machine for multiplication including a multiplication key, a control lever having an escapement face and operable to set one or more of said multiplying devices, a connection between the key and the lever normally holding the lever against movement and operable upon depression of the key to put the lever under spring tension, a rocker reciprocated by said registering means and having a projection normally located above the escapement face of the lever, and a latch mounted on the lever and normally engaging the projection to hold the lever against movement, said projection upon forward movement of the rocker moving out of contact with the latch to permit partial movement of the lever to bring the escapement face in contact with the projection, and the projection being operable upon return movement of the rocker to lift the latch.

4. In a multiplying calculator, the combination with multiplicand registering means, multiplier storage members adjustable between two extreme spaced positions, and factor installing means operable to set a multiplier value in said storage members; of means cooperating with said storage members to control the calculation of a product including a reciprocatory counting finger adapted to advance or retract the related storage member step by step, a switch operable to control the path of movement of the counting finger to reverse the stepwise action thereof, a member settable by contact with a storage member signifying one of the digits from 5 to 9 to control the position of the switch, a feeler engageable with the operated switch to reverse the sign of the multiplicand registration, and a device indexed by the storage member and operable when said member is stepped forwardly or reversely to one or the other extreme position to terminate the multiplier digit registration.

5. In a multiplying calculator, the combination with registering mechanism and cooperating multiplier mechanism including settable multiplier storage members provided with zero notches, means for setting a multiplier value in said storage members, an ordinally shiftable counting finger operable to advance said storage members step by step to zero position, and a spring active to shift said finger; of a counting finger stop shiftable with the counting finger, movable through the zero notches of the storage members and effective to stop the finger opposite a set storage member, a locator for said finger effective to relieve the storage members from the load of the shifting spring, and means for releasing the locator when the counting finger has advanced a storage member to zero.

LORING PICKERING CROSMAN.